(12) United States Patent
Nagasaka

(10) Patent No.: US 11,221,757 B2
(45) Date of Patent: Jan. 11, 2022

(54) ELECTRONIC DEVICE, CONTROL METHOD, AND PROGRAM

(71) Applicant: KYOCERA Corporation, Kyoto (JP)

(72) Inventor: Yushi Nagasaka, Ritto (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/810,187

(22) Filed: Nov. 13, 2017

(65) Prior Publication Data
US 2018/0136836 A1 May 17, 2018

(30) Foreign Application Priority Data
Nov. 14, 2016 (JP) .............................. JP2016-221562

(51) Int. Cl.
G06F 3/0488 (2013.01)
G06F 1/16 (2006.01)
G06F 3/0482 (2013.01)
G06F 3/0489 (2013.01)
G06F 3/023 (2006.01)

(52) U.S. Cl.
CPC ........ G06F 3/04886 (2013.01); G06F 1/1643 (2013.01); G06F 3/0236 (2013.01); G06F 3/0237 (2013.01); G06F 3/0482 (2013.01); G06F 3/0489 (2013.01); G06F 3/04883 (2013.01)

(58) Field of Classification Search
CPC .. G06F 3/04886; G06F 1/1643; G06F 3/0236; G06F 3/0237; G06F 3/0482; G06F 3/04883; G06F 3/0489
USPC .................................................... 715/773
See application file for complete search history.

(56) References Cited

U.S. PATENT DOCUMENTS

| 10,198,179 | B2 | 2/2019 | Ukai et al. | |
| 2010/0306702 | A1* | 12/2010 | Warner | G06F 3/0482 715/811 |
| 2012/0306788 | A1* | 12/2012 | Chen | G06F 3/04886 345/173 |
| 2013/0120447 | A1* | 5/2013 | Kim | G06F 3/0481 345/629 |
| 2013/0241838 | A1 | 9/2013 | Onishi et al. | |
| 2016/0062515 | A1* | 3/2016 | Bae | G06F 3/0418 345/174 |
| 2016/0070466 | A1* | 3/2016 | Chaudhri | G06F 3/0484 715/765 |
| 2017/0277430 | A1* | 9/2017 | Ukai | G06F 3/0482 |

FOREIGN PATENT DOCUMENTS

| JP | 20123545 A | 1/2012 |
| JP | 2016-162267 A | 9/2016 |
| WO | 2008/086302 A1 | 7/2008 |

* cited by examiner

Primary Examiner — Haoshian Shih
Assistant Examiner — Darrin Hope
(74) Attorney, Agent, or Firm — Hauptman Ham, LLP

(57) ABSTRACT

An electronic device comprises: a touchscreen display; and a controller configured to cause the touchscreen display to display a first key group and a second key group. The controller is configured to arrange the first key group along an edge of the touchscreen display, and arrange the second key group along the first key group.

6 Claims, 17 Drawing Sheets

FIG. 7

| | あ行 | か行 | さ行 | た行 | な行 | は行 | ま行 | や行 | ら行 | わ行 |
|---|---|---|---|---|---|---|---|---|---|---|
| あ段 | あ | か | さ | た | な | は | ま | や | ら | わ |
| い段 | い | き | し | ち | に | ひ | み | ゆ | り | を |
| う段 | う | く | す | つ | ぬ | ふ | む | よ | る | ん |
| え段 | え | け | せ | て | ね | へ | め | | れ | |
| お段 | お | こ | そ | と | の | ほ | も | | ろ | |
| FUNCTION 1 | END OF LINE | END OF LINE | END OF LINE | END OF LINE | END OF LINE | END OF LINE | END OF LINE | END OF LINE | END OF LINE | END OF LINE |
| FUNCTION 2 | DELETE | DELETE | DELETE | DELETE | DELETE | DELETE | DELETE | DELETE | DELETE | DELETE |
| FUNCTION 3 | ALPHA-NUMERIC | ALPHA-NUMERIC | ALPHA-NUMERIC | ALPHA-NUMERIC | ALPHA-NUMERIC | ALPHA-NUMERIC | ALPHA-NUMERIC | ALPHA-NUMERIC | ALPHA-NUMERIC | ALPHA-NUMERIC |
| FUNCTION 4 | ゛゜あ⇔あ | ゛゜あ⇔あ | ゛゜あ⇔あ | ゛゜あ⇔あ | ゛゜あ⇔あ | ゛゜あ⇔あ | ゛゜あ⇔あ | ゛゜あ⇔あ | ゛゜あ⇔あ | ゛゜あ⇔あ |
| FUNCTION 5 | READ | READ | READ | READ | READ | READ | READ | READ | READ | READ |

ELECTRONIC DEVICE, CONTROL METHOD, AND PROGRAM

CROSS-REFERENCE TO RELATED APPLICATION

This application claims priority to and the benefit of Japanese Patent Application No. 2016-221562 filed Nov. 14, 2016, the entire contents of which are incorporated herein by reference.

TECHNICAL FIELD

This disclosure relates to an electronic device, a control method, and a program. This disclosure particularly relates to an electronic device having a character input function, a control method for the electronic device, and a control program for the electronic device.

BACKGROUND

Electronic devices having touchscreens are known. For example, an electronic device is known that performs various functions in response to operations detected through a touchscreen.

SUMMARY

An electronic device according to one embodiment of the present disclosure comprises: a touchscreen display; and a controller configured to cause the touchscreen display to display a first key group and a second key group. The controller is configured to arrange the first key group along an edge of the touchscreen display, and arrange the second key group along the first key group.

A control method according to one embodiment of the present disclosure is for an electronic device that includes a touchscreen display and a controller configured to cause the touchscreen display to display a first key group and a second key group. The control method comprises: arranging, by the controller, the first key group along an edge of the touchscreen display and arranging the second key group along the first key group.

A non-transitory computer-readable storage medium according to one embodiment of the present disclosure stores a program for controlling an electronic device that includes a touchscreen display and a controller configured to cause the touchscreen display to display a first key group and a second key group. The program, when executed, causes the controller to: arrange the first key group along an edge of the touchscreen display, and arrange the second key group along the first key group.

According to one embodiment of the present disclosure, it is possible to provide an electronic device, a control method, and a program that improve character input operability and the like.

BRIEF DESCRIPTION OF THE DRAWINGS

In the accompanying drawings:

FIG. 7 is a diagram illustrating key data in the electronic device according to an embodiment of the disclosure;

DETAILED DESCRIPTION

Some embodiments of an electronic device, a control method, and a program according to this disclosure will be described in detail with reference to the drawings.

Some embodiments of the electronic device according to this disclosure are described below as, for example, a portable device such as a smartphone. However, this disclosure is not limited to a portable device such as a smartphone. This disclosure can be applied to various electronic devices such as a mobile phone, a tablet PC, a notebook PC, a digital camera terminal, and a digital audio player. This disclosure can be applied to not only these portable devices but also electronic devices that may not be portable.

An Embodiment of the Disclosure

Figure 1:
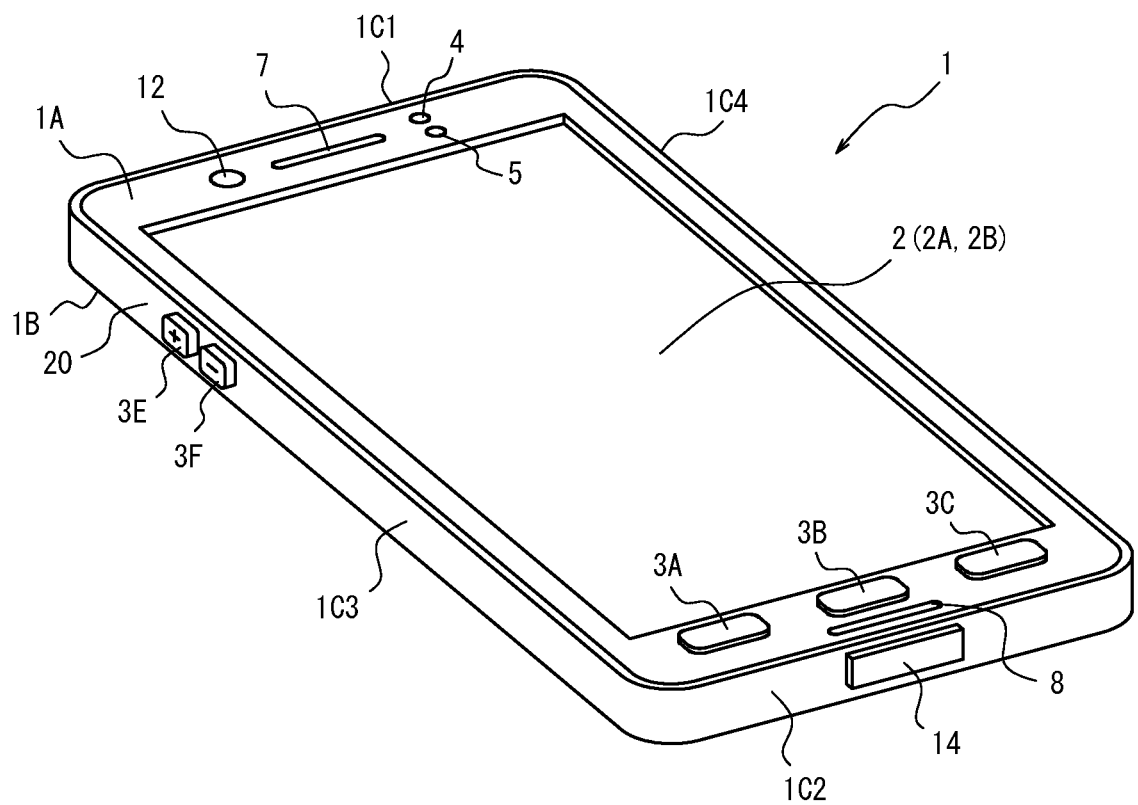
FIG. 1 is a perspective view of an electronic device according to an embodiment of the disclosure.
Figure 2:
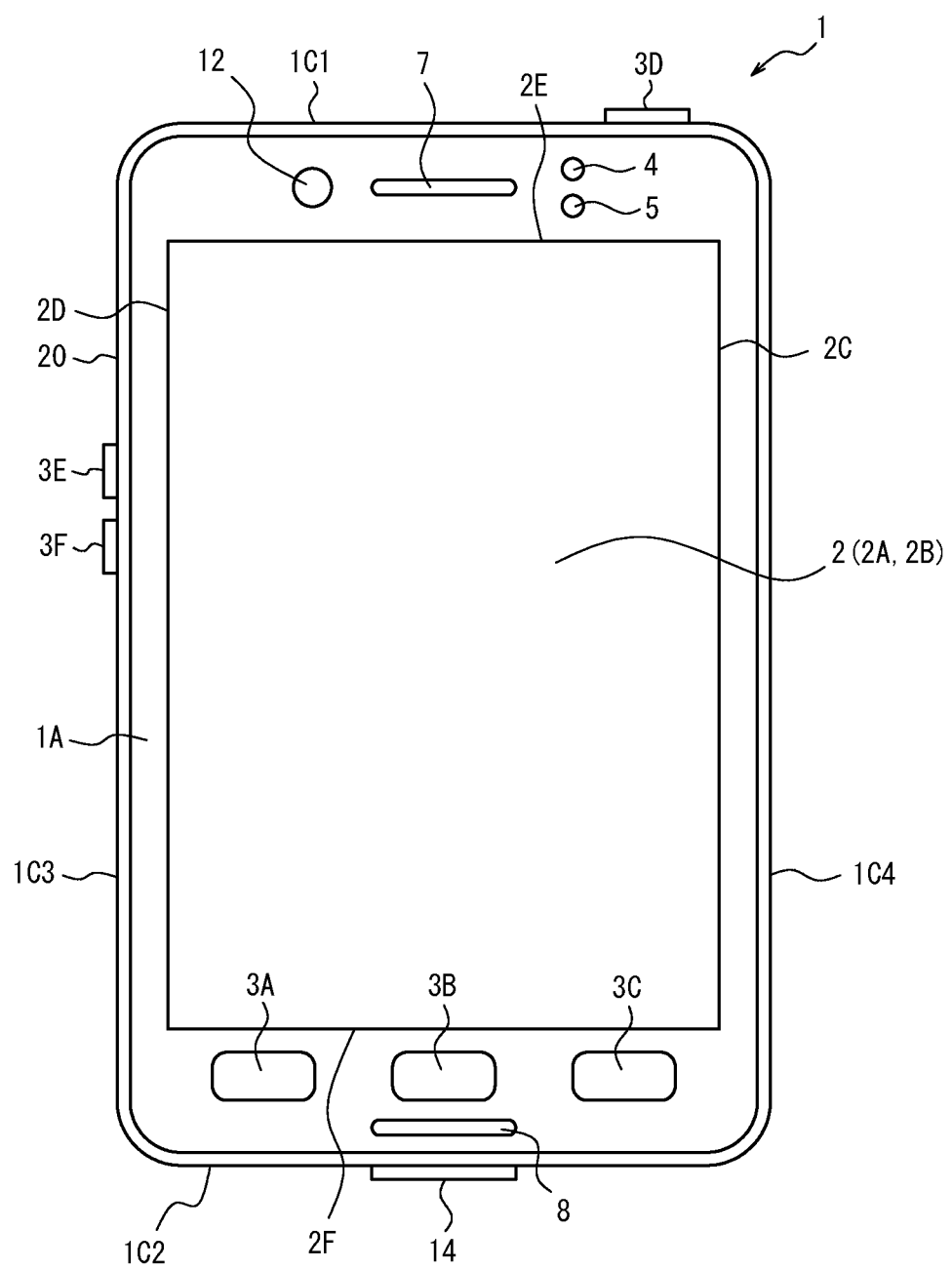
FIG. 2 is a front view of the electronic device according to an embodiment of the disclosure.
Figure 3:
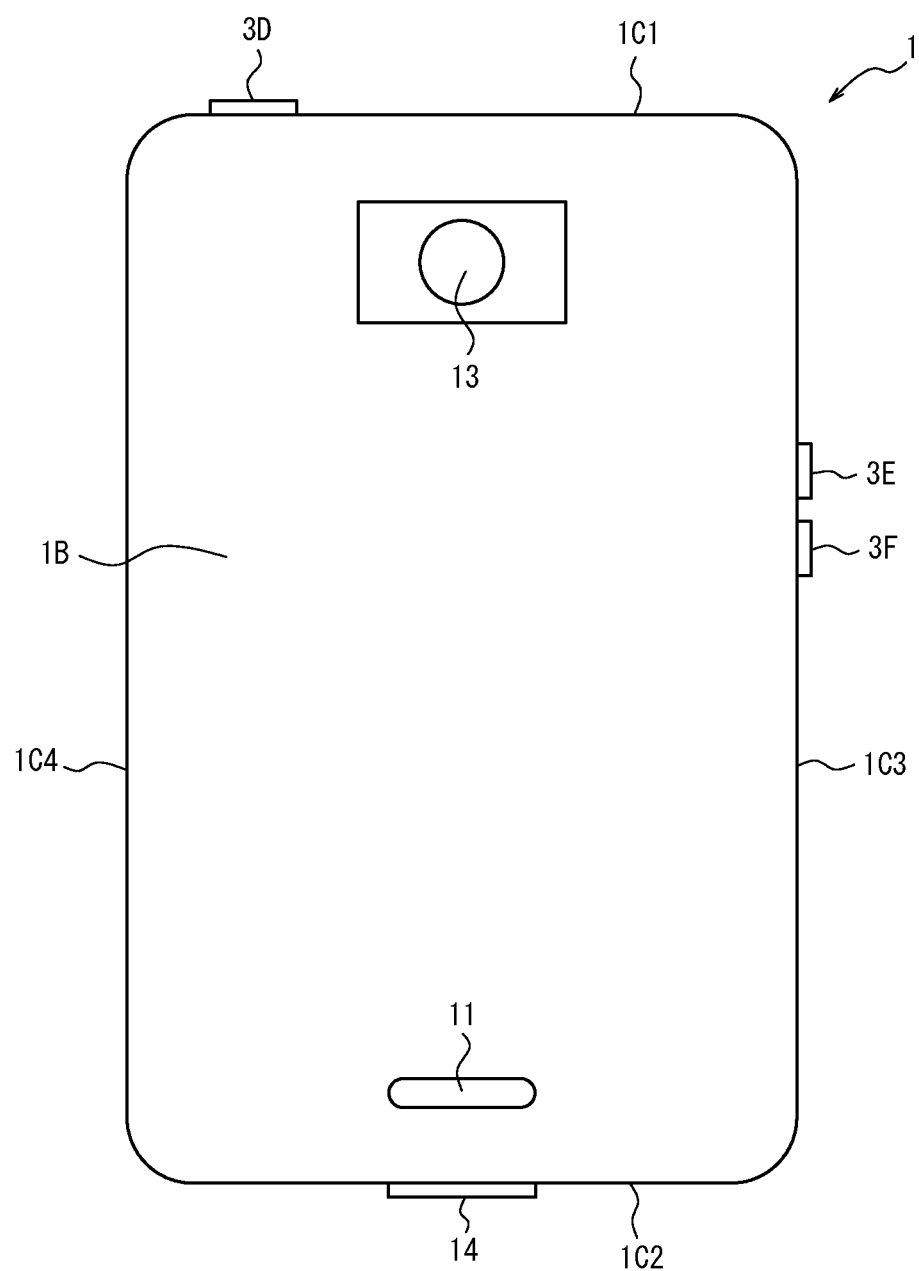
FIG. 3 is a back view of the electronic device according to an embodiment of the disclosure.

The overall structure of an electronic device 1 according to an embodiment of the disclosure is described with reference to FIGS. 1 to 3. As illustrated in FIGS. 1 to 3, the electronic device 1 includes a housing 20. The housing 20 has a front face 1A, a back face 1B, and side faces 1C1 to 1C4. The front face 1A is the front of the housing 20. The back face 1B is the back of the housing 20. The side faces 1C1 to 1C4 are the sides connecting the front face 1A and the back face 1B. Hereafter, the side faces 1C1 to 1C4 are also collectively referred to as "side faces 1C" without distinguishing between them.

The electronic device 1 includes a touchscreen display 2, buttons (keys) 3A to 3C, an illumination sensor 4, a proximity sensor 5, a receiver 7, a microphone 8, and a camera 12 on the front face 1A. The electronic device 1 includes a speaker 11 and a camera 13 on the back face 1B. The electronic device 1 includes buttons 3D to 3F and a connector 14 on the side faces 1C. Hereafter, the buttons 3A to 3F are also collectively referred to as "buttons 3" without distinguishing between them.

The touchscreen display 2 includes a display 2A and a touchscreen 2B. Although the display 2A and the touchscreen 2B are each approximately rectangular in shape in the example illustrated in FIG. 1, the shape of each of the display 2A and the touchscreen 2B is not limited thereto. The display 2A and the touchscreen 2B may each have any shape such as a square or a circle. Although the display 2A and the touchscreen 2B overlap each other in the example illustrated in FIG. 1, the arrangement of the display 2A and the touchscreen 2B is not limited thereto. For example, the display 2A and the touchscreen 2B may be arranged side by side, or arranged away from each other.

Although the long side of the display 2A extends along the long side of the touchscreen 2B and the short side of the display 2A extends along the short side of the touchscreen 2B in the example illustrated in FIG. 1, the state in which the display 2A and the touchscreen 2B overlap each other is not limited thereto. In the case where the display 2A and the touchscreen 2B overlap each other, for example, one or more sides of the display 2A may not extend along any side of the touchscreen 2B. Here, the touchscreen display 2 is rectangular in shape, and has four sides 2C, 2D, 2E, and 2F adjacent to the side faces 1C1 to 1C4 of the housing 20. The side 2C of the touchscreen display 2 is adjacent to the side face 1C4 of the housing 20, and the side 2D of the touchscreen display 2 is adjacent to the side face 1C3 of the housing 20.

The display 2A includes a display device such as a liquid crystal display (LCD), an organic electro-luminescence display (OELD), or an inorganic electro-luminescence display (IELD). The display 2A displays characters, images, symbols, graphics, and the like.

The touchscreen 2B detects contact of a finger, a pen, a stylus, or the like on the touchscreen 2B. The touchscreen 2B is capable of detecting positions where a plurality of fingers, pens, styluses, or the like touches the touchscreen 2B. Hereafter, a finger, a pen, a stylus, or the like that touches the touchscreen 2B is also simply referred to as a "contact object".

The touchscreen 2B may use any detection method such as capacitive, resistive, surface acoustic wave, or load sensing. The following description assumes that the user touches the touchscreen 2B with his or her finger (or fingers) to operate the electronic device 1, for simplicity of explanation.

The electronic device 1 determines the type of gesture on the basis of at least one of a touch detected by the touchscreen 2B, a position where the touch is detected, a change of the position where the touch is detected, an interval at which touches are detected, and the number of touches detected. A gesture is an operation performed on the touchscreen 2B. Examples of the gesture determined by the electronic device 1 include, but are not limited to, touch, long touch, release, slide, swipe, tap, double tap, long tap, drag, flick, pinch in, and pinch out.

The electronic device 1 operates according to these gestures determined through the touchscreen 2B. This enables the user to operate the electronic device 1 intuitively and easily. The operations performed by the electronic device 1 according to the determined gestures may differ depending on the screen displayed on the display 2A. Hereafter, "the touchscreen 2B detects contact and the electronic device 1 determines the type of gesture as X on the basis of the detected contact" is also simply referred to as "the electronic device 1 detects X" or "the controller detects X", for simplicity of explanation.

Figure 4:
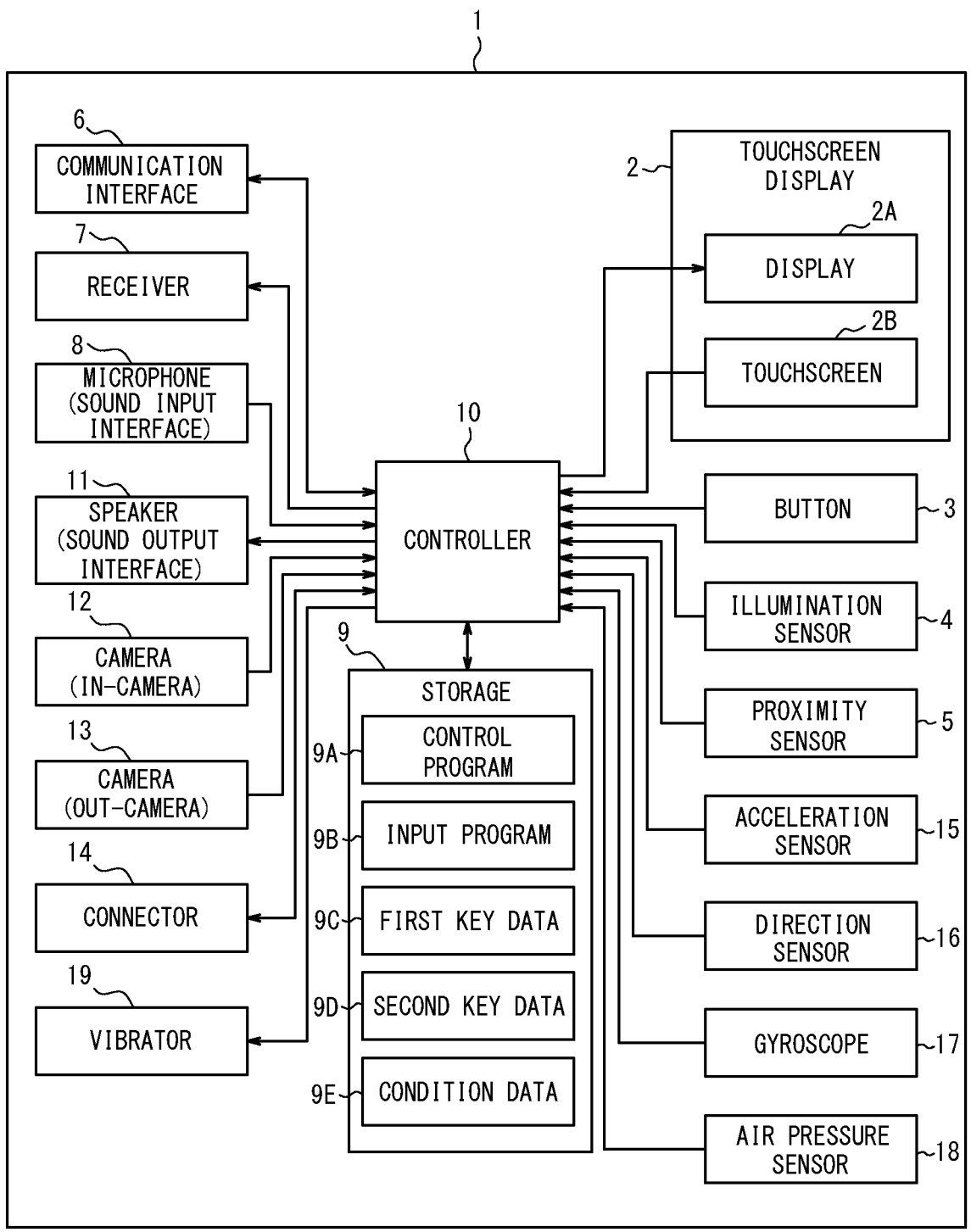
FIG. 4 is a block diagram illustrating the functions of the electronic device according to an embodiment of the disclosure.

FIG. 4 is a block diagram illustrating the functions of the electronic device 1. The electronic device 1 includes the touchscreen display 2, the buttons 3, the illumination sensor 4, the proximity sensor 5, a communication interface 6, the receiver 7, the microphone 8, a storage 9, and a controller 10. The electronic device 1 also includes the speaker 11, the cameras 12 and 13, the connector 14, an acceleration sensor 15, a direction sensor 16, a gyroscope 17, an air pressure sensor 18, and a vibrator 19.

The touchscreen display 2 includes the display 2A and the touchscreen 2B, as mentioned above. The display 2A displays characters, images, symbols, graphics, and the like. The touchscreen 2B detects contact. The controller 10 detects gestures on the electronic device 1. In detail, the controller 10 detects operations (gestures) on the touchscreen 2B (touchscreen display 2), in cooperation with the touchscreen 2B.

Figure 5:
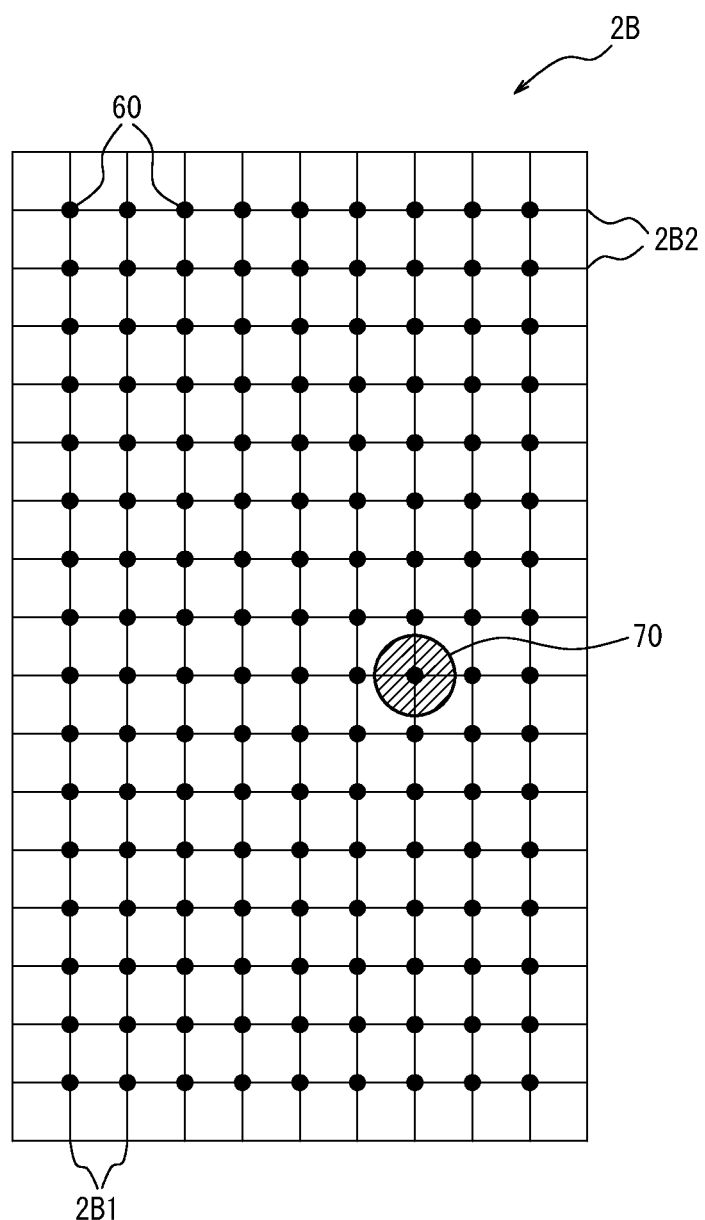
FIG. 5 is a diagram illustrating an example of a detection structure in a touchscreen according to an embodiment of the disclosure.

As illustrated in FIG. 5, the touchscreen 2B includes a plurality of first electrodes 2B1 and a plurality of second electrodes 2B2. The plurality of first electrodes 2B1 extends in the long side direction of the touchscreen 2B. The plurality of second electrodes 2B2 extends in the short side direction of the touchscreen 2B. The plurality of first electrodes 2B1 and the plurality of second electrodes 2B2 intersect each other in a matrix. Each of the parts where the first electrodes 2B1 and the second electrodes 2B2 intersect is a detection point 60 of the touchscreen 2B. The touchscreen 2B includes a plurality of detection points 60. The plurality of detection points 60 is used in the case where the electronic device 1 identifies a contact position (contact point) of a contact object on the touchscreen 2B. The plurality of detection points 60 forms a matrix on the touchscreen 2B.

On the touchscreen 2B, when a conductive contact object approaches a first electrode 2B1 and a second electrode 2B2, capacitive coupling occurs between the contact object and the electrodes, and the detection value at the detection point 60 between the capacitive-coupled electrodes changes. In the example illustrated in FIG. 5, the detection value of the detection point 60 near the contact point 70 of the contact object becomes greater than the detection values of the other detection points 60 on the touchscreen 2B. Based on the change in the detection value of the detection point 60, the electronic device 1 can detect the contact point 70 of the contact object on the touchscreen 2B.

The buttons 3 are switches operated by the user. The buttons 3 include the buttons 3A to 3F. The controller 10 detects operation on the buttons 3, in cooperation with the buttons 3. Examples of the operation on the buttons 3 include, but are not limited to, click, double click, triple click, push, and multi-push. Operation on the buttons 3 may be distinguished between long press and short press, depending on whether or not the time during which the buttons 3 are pressed is more than a predetermined threshold.

The buttons 3A to 3C are, for example, a back button, a home button, and a menu button. The button 3D is, for example, a power on/off button of the electronic device 1. The button 3D may also function as a sleep/sleep release button of the electronic device 1. The buttons 3E and 3F are, for example, volume buttons for sound output from the receiver 7 or the speaker 11 of the electronic device 1.

The illumination sensor 4 detects illuminance of ambient light of the electronic device 1. The illuminance indicates the intensity or brightness of light. For example, the illumination sensor 4 is used to adjust the brightness of the display 2A. The proximity sensor 5 detects the presence of a nearby object contactlessly. The proximity sensor 5 detects the presence of the object based on a change in magnetic field, a change in return time of a reflected ultrasonic wave, or the like. For example, the proximity sensor 5 detects that the touchscreen display 2 is brought close to the user's face. The illumination sensor 4 and the proximity sensor 5 may be configured as one sensor. The illumination sensor 4 may be used as a proximity sensor.

The communication interface 6 performs wireless communication. The communication interface 6 supports a wireless communication standard. The wireless communication standard is, for example, a communication standard of cellar phones such as 2G, 3G, and 4G. Examples of the communication standard of cellar phones include Long Term Evolution (LTE), Wideband Code Division Multiple Access (W-CDMA), Wideband Code Division Multiple Access 2000 (CDMA 2000), Personal Digital Cellular (PDC), Global System for Mobile Communications (GSM® (GSM is a registered trademark in Japan, other countries, or both)), and Personal Handy-phone System (PHS). Examples of the wireless communication standard further include Worldwide Interoperability for Microwave Access (WiMAX), IEEE 802.11, Bluetooth® (Bluetooth is a registered trademark in Japan, other countries, or both), Infrared Data Association (IrDA), and Near Field Communication (NFC). The communication interface 6 may support one or more of the communication standards mentioned above.

The receiver 7 and the speaker 11 are each an example of a sound output interface. The receiver 7 and the speaker 11 are each capable of outputting a sound signal received from the controller 10, as sound. The receiver 7 may be used, for example, to output the voice of the other party during a call. The speaker 11 may be used, for example, to output ringtone and music. One of the receiver 7 and the speaker 11 may also function as the other one of the receiver 7 and the speaker 11. The microphone 8 is an example of a sound input interface. The microphone 8 is capable of converting the voice of the user or the like to a sound signal and transmitting the sound signal to the controller 10.

The storage 9 is capable of storing programs and data. The storage 9 may be used as a work area for temporarily storing a processing result of the controller 10. The storage 9 includes a recording medium. The recording medium may include any non-transitory storage medium such as a semiconductor storage medium or a magnetic storage medium. The storage 9 may include a plurality of types of storage mediums. The storage 9 may include a combination of a portable storage medium such as a memory card, an optical disc, or a magneto-optical disc and a reader of the storage medium. The storage 9 may include a storage device used as a temporary storage area such as random access memory (RAM).

Programs stored in the storage 9 include application software (hereafter simply referred to as "application") executed in the foreground or the background, and a control program for assisting the operations of the applications. The application, for example, causes the display 2A to display a screen, and causes the controller 10 to perform a process corresponding to a gesture detected through the touchscreen 2B. The control program is, for example, an operating system (OS). The applications and the control program may be installed in the storage 9 through wireless communication by the communication interface 6 or via a non-transitory storage medium.

The storage 9 stores, for example, a control program 9A, an input program 9B, first key data 9C, second key data 9D, and condition data 9E.

The control program 9A is capable of providing functions relating to various controls for operating the electronic device 1. For example, the control program 9A controls the communication interface 6, the receiver 7, the microphone 8, and the like, to realize a call function. The functions provided by the control program 9A include a function of performing various controls such as changing information displayed on the display 2A in response to a gesture detected through the touchscreen 2B. The functions provided by the control program 9A include a function of controlling the acceleration sensor 15, the air pressure sensor 18, and the like to detect a movement of the user holding the electronic device 1, termination of the movement, etc. The functions provided by the control program 9A may be used in combination with a function provided by another program such as a calculation application or a call application.

The input program 9B is capable of providing a function of inputting text (character) to the electronic device 1. The input program 9B causes a first key group to be displayed in a first key area, and a second key group to be displayed in a second key area. By such display, the input program 9B enables character input. The method of character input by the electronic device 1 will be described in detail later. The input program 9B may have a function of enabling character input by any other input method.

The first key data 9C includes information of the first key group displayed in the first key area, which is set by the input program 9B. The second key data 9D includes information of the second key group displayed in the second key area, which is set by the input program 9B. The second key data 9D is data of keys associated with the first key data 9C. The first key data 9C and the second key data 9D will be described in detail later.

The condition data 9E sets various conditions for executing a process in the input program 9B. In detail, the condition data 9E sets the correspondence relationship between each detected touch gesture and a process executed in response to the touch gesture, conditions of the program, stop conditions, and the like.

The controller 10 includes a processor. Examples of the processor include, but are not limited to, a central processing unit (CPU), a system-on-a-chip (SoC), a micro control unit (MCU), a field-programmable gate array (FPGA), and a coprocessor. The controller 10 can integrally control the operation of the electronic device 1. Various functions of the electronic device 1 are realized under the control of the controller 10.

In detail, the controller 10 is capable of executing instructions included in the programs stored in the storage 9. The controller 10 is capable of referring to the data stored in the storage 9 as necessary. The controller 10 controls functional components according to the data and the instructions. By controlling the functional components, the controller 10 realizes various functions. For example, the function components include, but are not limited to, the display 2A, the communication interface 6, the receiver 7, and the speaker 11. The controller 10 can change control according to a detection result of a detector. Examples of the detector include, but are not limited to, the touchscreen 2B, the buttons 3, the illumination sensor 4, the proximity sensor 5, the microphone 8, the camera 12, the camera 13, the acceleration sensor 15, the direction sensor 16, the gyroscope 17, and the air pressure sensor 18.

For example, by executing the control program 9A or the input program 9B, the controller 10 can perform various controls such as changing information displayed on the display 2A in response to a gesture detected through the touchscreen 2B.

The camera 12 is a front-facing-camera for photographing a subject facing the front face 1A. The camera 13 is a rear-facing-camera for photographing a subject facing the back face 1B.

The connector 14 is a terminal to which another device is connected. The connector 14 may be a general-purpose terminal such as a Universal Serial Bus (USB), a High-Definition Multimedia Interface (HDMI® (HDMI is a registered trademark in Japan, other countries, or both)), Light Peak (Thunderbolt® (Thunderbolt is a registered trademark in Japan, other countries, or both)), an earphone connector, or a microphone connector. The connector 14 may be a dedicated terminal such as a dock connector. Examples of the device connected to the connector 14 include, but are not limited to, an external storage, a speaker, and a communication device.

The acceleration sensor 15 is capable of detecting the direction and magnitude of acceleration acting on the electronic device 1. The direction sensor 16 is capable of detecting the direction of geomagnetism. The gyroscope 17 is capable of detecting the angle and angular velocity of the electronic device 1. The air pressure sensor 18 is capable of detecting the air pressure acting on the electronic device 1. The detection results of the acceleration sensor 15, the direction sensor 16, the gyroscope 17, and the air pressure sensor 18 may be used in combination as appropriate, in order to detect a change in position and attitude of the electronic device 1.

The vibrator 19 provides tactile sensation to the user of the electronic device 1, for example, by causing vibration in any part of the electronic device 1. The vibrator 19 may be any member that generates vibration, such as an eccentric motor, a piezoelectric element, or a linear vibrator.

Part or all of the programs and the data stored in the storage 9 in FIG. 4 may be downloaded from any other device through wireless communication by the communication interface 6. Part or all of the programs and the data stored in the storage 9 in FIG. 4 may be stored in a non-transitory recording medium that can be read by a reader included in the storage 9. Part or all of the programs and the data stored in the storage 9 in FIG. 4 may be stored in a non-transitory recording medium that can be read by a reader connected to the connector 14. Examples of the non-transitory recording medium include, but are not limited to, an optical disc such as CD® (CD is a registered trademark in Japan, other countries, or both), DVD® (DVD is a registered trademark in Japan, other countries, or both), and Blu-ray® (Blu-ray is a registered trademark in Japan, other countries, or both), a magneto-optical disc, a magnetic storage medium, a memory card, and a solid-state storage medium.

The structure of the electronic device 1 illustrated in FIG. 4 is only an example, and therefore can be modified as appropriate without departing from the gist of this disclosure. For example, the number, type, and arrangement of the buttons 3 are not limited to the example illustrated in FIG. 4. The electronic device 1 may include buttons of a numeric keypad layout, a QWERTY layout, or the like as buttons for screen-related operation, instead of the buttons 3A to 3C. The electronic device 1 may include only one button for screen-related operation, or include no button. Although the electronic device 1 includes two cameras in the example illustrated in FIG. 4, the electronic device 1 may include only one camera, or include no camera. Although the electronic device 1 includes four types of sensors for detecting its position and attitude in the example illustrated in FIG. 4, some of the sensors may be omitted. Alternatively, the electronic device 1 may include any other type of sensor for detecting at least one of the position and the attitude.

Figure 6:
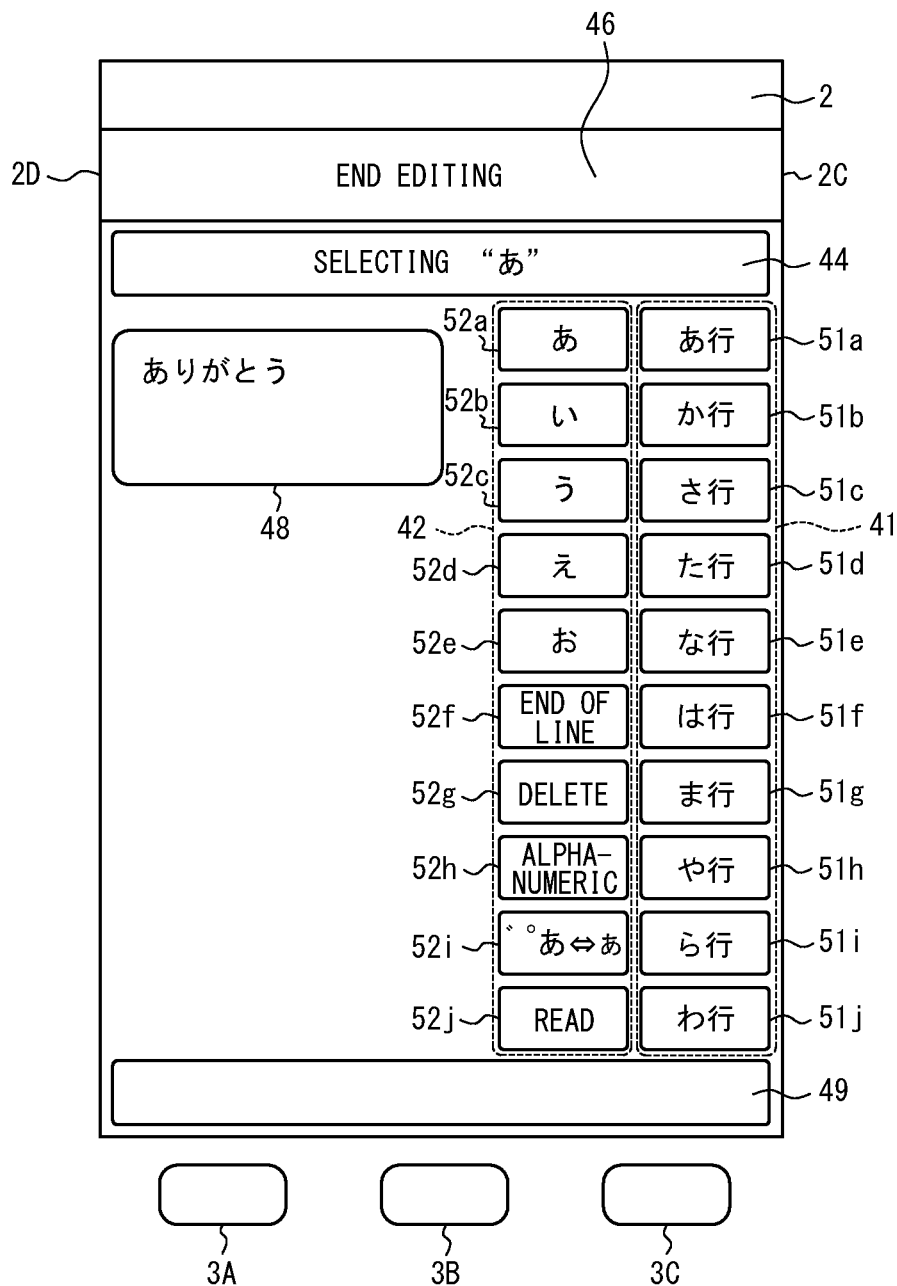
FIG. 6 is a diagram illustrating operation of the electronic device according to an embodiment of the disclosure.

Character input by the electronic device 1 is described below. FIG. 6 is a diagram illustrating an example of a screen displayed upon character input by the electronic device 1. In the case of performing a character input process using the input program 9B, the electronic device 1 causes the screen illustrated in FIG. 6 to be displayed. The screen illustrated in FIG. 6 includes a first key area 41, a second key area 42, a state notification field 44, an end key 46, an input text display field 48, and an OK key 49.

The first key area 41 is provided along the side 2C of the touchscreen display 2, and is adjacent to the side 2C. Thus, the first key area 41 is adjacent to the side face 1C4 of the housing 20. The first key group is displayed in the first key area 41. The first key group includes part or all of first keys 51a, 51b, 51c, 51d, 51e, 51f, 51g, 51h, 51i, and 51j. Part or all of the first keys 51a to 51j included in the first key group are hereafter collectively referred to as "first key group 51" as appropriate. In this embodiment, the first key group 51 is arranged in a line from the upper to lower sides of the screen along the side 2C, that is, arranged along an edge of the touchscreen display 2.

In this embodiment, the first keys 51a, 51b, 51c, 51d, 51e, 51f, 51g, 51h, 51i, and 51j are each associated with the contents of the first key data 9C. FIG. 7 is a diagram illustrating an example of the first key data 9C and the second key data 9D. In FIG. 7, "あ行", "か行", "さ行", "た行", "な行", "は行", "ま行", "や行", "ら行", and "わ行" in the first row (top row) are each an example of columns in the Japanese language "kana" syllabary in the first key data 9C. Thus, in this embodiment, the first key 51a is associated with information in the first key data 9C. In the case of "kana" input, an image of "あ行" is displayed in the first key 51a. Likewise, an image of "か行" is displayed in the first key 51b, an image of "さ行" is displayed in the first key 51c, . . . , and an image of "わ行" is displayed in the first key 51j.

The second key area 42 is provided along the first key area 41, in parallel with the side 2C of the touchscreen display 2. The second key group is displayed in the second key area 42.

The second key group includes part or all of second keys 52*a*, 52*b*, 52*c*, 52*d*, 52*e*, 52*f*, 52*g*, 52*h*, 52*i*, and 52*j*. Part or all of the second keys 52*a* to 52*j* included in the second key group are hereafter collectively referred to as "second key group 52" as appropriate. In this embodiment, the second key group 52 is arranged in a line from the upper to lower sides of the screen along the first key group.

In this embodiment, the second keys 52*a*, 52*b*, 52*c*, 52*d*, 52*e*, 52*f*, 52*g*, 52*h*, 52*i*, and 52*j* are each associated with the contents of the second key data 9D. In FIG. 7, "あ段", "い段", "う段", "え段", and "お段" indicated in the respective rows in association with each of the columns "あ行" to "わ行" are each an example of rows in the Japanese language syllabary in the second key data 9D. Moreover, "function 1", "function 2", "function 3", "function 4", and "function 5" indicated in the respective rows in association with each of the columns "あ行" to "わ行" may be each included in an example of Japanese language in the second key data 9D.

Hence, in this embodiment, in the case where the second key group corresponds to "あ行", the second key 52*a* is associated with information in the first key data 9C. In the case of "kana" input, an image of "あ" is displayed in the second key 52*a*. Likewise, in the case where the second key group corresponds to "あ行", an image of "い" is displayed in the second key 52*b*, an image of "う" is displayed in the second key 52*c*, . . . , and an image of "お" is displayed in the second key 52*e*.

Moreover, in this embodiment, in the case where the second key group corresponds to "わ行", the second key 52*a* is associated with information in the first key data 9C. In the case of "kana" input, an image of "か" is displayed in the second key 52*a*. Likewise, in the case where the second key group corresponds to "か行", an image of "き" is displayed in the second key 52*b*, an image of "く" is displayed in the second key 52*c*, . . . , and an image of "こ" is displayed in the second key 52*e*. The same applies to the case where the second key group corresponds to "さ行", "た行", "な行", etc.

Moreover, in this embodiment, in the case where the second key group corresponds to each column such as "あ行", the second keys 52*f* to 52*j* may be associated with the contents of "function 1" to "function 5" in the respective rows in FIG. 7. In such a case, when input of a key corresponding to any of "function 1" to "function 5" is confirmed, the corresponding function is performed.

For example, in the case where the second key group corresponds to "あ行", the second key 52*f* may be assigned an "end of line" function. In this case, when input of the key is confirmed, the controller 10 performs the "end of line" function for an input character. Moreover, in the case where the second key group corresponds to "あ行", the second key 52*g* may be assigned a "delete" function. In this case, when input of the key is confirmed, the controller 10 performs the "delete" function for a character. The "delete" function for a character may be a function of deleting a character at the cursor position (a character immediately preceding the cursor). The "delete" function for a character may be a function of deleting the last input character. Moreover, in the case where the second key group corresponds to "あ行", the second key 52*h* may be assigned an "alphanumeric" function. In this case, when input of the key is confirmed, the controller 10 performs a function of inputting "alphanumeric" characters. Moreover, in the case where the second key group corresponds to "あ行", the second key 52*i* may be assigned a voicing mark and small form function. In this case, when input of the key is confirmed, the controller 10 performs a function of adding the voicing mark or the half-voicing mark to an input character, or a function of switching a kana character between normal form and small form. Moreover, in the case where the second key group corresponds to "あ行", the second key 52*j* may be assigned a "read" function. In this case, when input of the key is confirmed, the controller 10 performs a function of reading aloud part or all of input characters as sound.

The state notification field 44 displays a character being selected as an input candidate. The end key 46 is associated with a text input end operation. The input text display field 48 displays input character(s). In FIG. 6, the input text display field 48 displays an input character string "ありがとう". The character string in FIG. 6 is an example. The OK key 49 is associated with operation of confirming the character of the input candidate as an input character. The OK key 49 is in contact with both of the sides 2C and 2D. The position of the OK key 49 is, however, not limited thereto.

The operation of the electronic device 1 upon character input is described below. FIGS. 8A, 8B, 9A, and 9B are each a diagram illustrating the operation of the electronic device 1 upon character input.

In the case of performing the character input process using the input program 9B, the electronic device 1 according to this embodiment displays the screen illustrated in FIG. 6, as mentioned above. In detail, when the electronic device 1 starts the input program 9B to start the character input process, the screen illustrated in FIG. 6 can be displayed. In the state in FIG. 6, the "あ行" to "わ行" keys are displayed in the first key area 41 respectively as the first keys 51*a* to 51*j* included in the first key group 51.

Thus, in the electronic device 1 according to this embodiment, when inputting Japanese kana characters, basically the "あ行" to "わ行" keys are displayed in the first key area 41 respectively as the first keys 51*a* to 51*j* included in the first key group 51. In the electronic device 1, the second key group 52 displayed in the second key area 52 changes in response to input of any of the first keys 51*a* to 51*j* displaying the "あ行" to "わ行" keys.

For example, in the state in FIG. 6, the keys of the respective characters ("あ", "い", "う", "え", "お") corresponding to the "あ行" key are displayed in the second key area 42 as the second keys 52*a* to 52*e* included in the second key group 52.

Figure 8A:
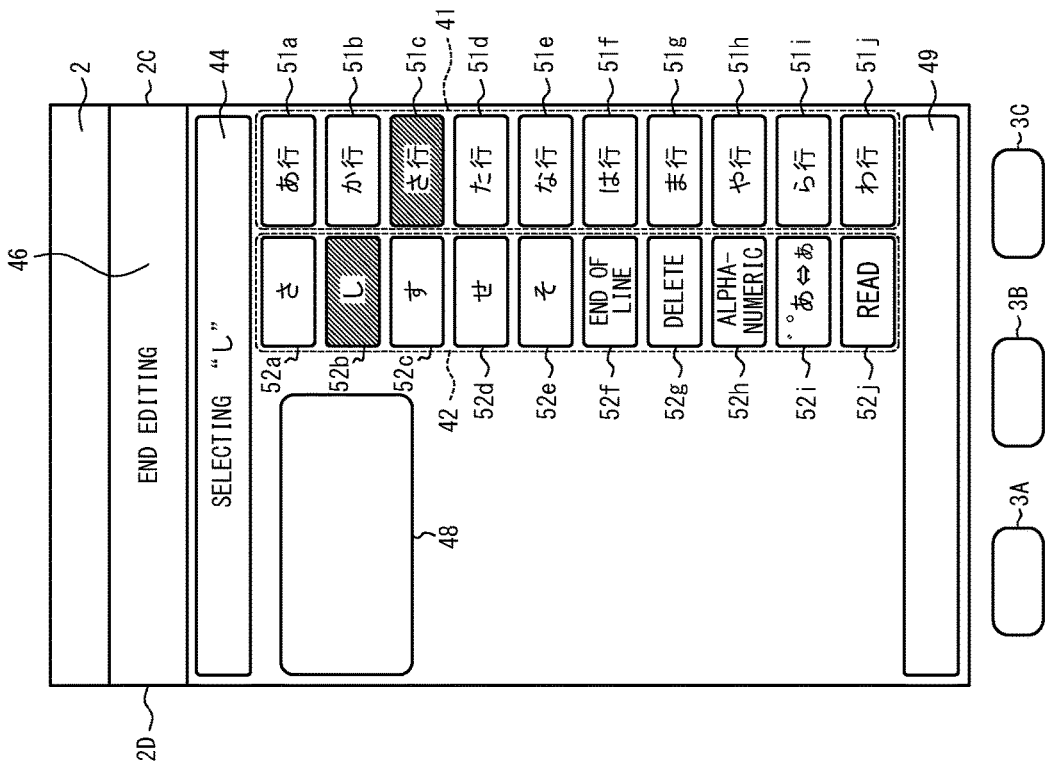
FIG. 8A is a diagram illustrating operation of the electronic device according to an embodiment of the disclosure.

For example, suppose input by the user's finger is detected at the "さ行" key of the first key 51*c* included in the first key group 51, in the state in FIG. 6. In this case, the controller 10 displays the keys of the respective characters ("さ", "し", "す", "せ", "そ") corresponding to the "さ行" key in the second key area 42 as the second keys 52*a* to 52*e* included in the second key group 52, as illustrated in FIG. 8A. In FIG. 8A, to indicate the detection of input of the "さ行" key of the first key 51*c*, the key is displayed differently from the other keys. Thus, the controller 10 may change the display of the key at which input is detected, from the other keys. This allows the user to visually recognize easily that input of the key is detected.

Figure 8B:
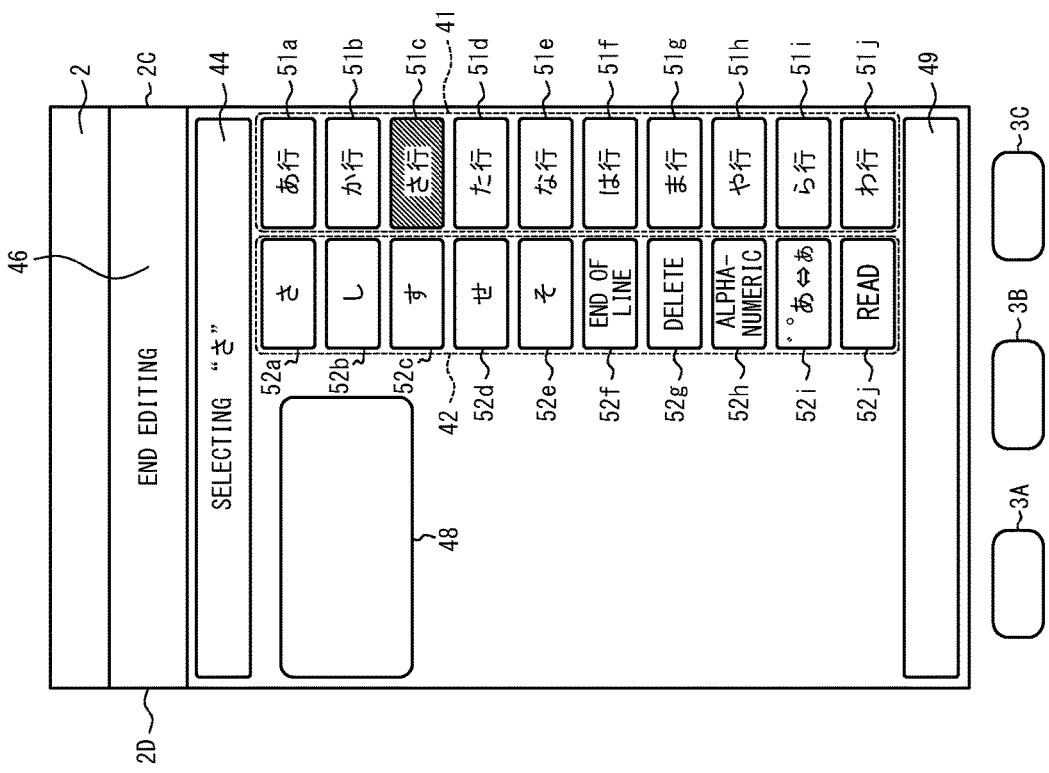
FIG. 8B is a diagram illustrating operation of the electronic device according to an embodiment of the disclosure.

For example, suppose input by the user's finger is detected at the "し" key in the second key 52*b* included in the second key group 52, in the state in FIG. 8A. In this case, the controller 10 selects the character "し" as an input character candidate, as illustrated in FIG. 8B. In FIG. 8B, to indicate that "し" is selected as an input character candidate, "selecting "し"" is displayed in the state notification field 44. In FIG. 8B, to indicate the detection of input of the "し" key in the second key 52*b*, the key is displayed differently from the other keys.

In the state in FIG. 8B, "し" is selected as an input character candidate, but an input character is not confirmed yet. Accordingly, in the state in FIG. 8B, for example, the controller 10 may confirm the currently selected input character candidate in response to detecting input of the OK key 49. For example, if input of the OK key 49 is detected in the state in FIG. 8B, the controller 10 may confirm the input character candidate and display the character "し" in the input text display field 48.

In this embodiment, the process of confirming the selected input character candidate is not limited to the use of the OK key 49. As an example, the selected input character candidate may be confirmed in response to input of any of the buttons 3A to 3B, as illustrated in FIGS. 6, 8A, and 8B. As another example, the selected input character candidate may be confirmed in response to input of any of the buttons 3D to 3F, as illustrated in FIGS. 1 to 3.

Alternatively, the selected input character candidate may be confirmed in response to a predetermined operation on the touchscreen display 2. As an example, the selected input character candidate may be confirmed if input to the touchscreen display 2 is released (i.e. if the user moves his or her finger or the like off the touchscreen display 2). As another example, the selected input character candidate may be confirmed if a predetermined operation such as double tap or flick is detected at a predetermined position or any position of the touchscreen display 2. As another example, the selected input character candidate may be confirmed if a predetermined pressing force is detected at a predetermined position or any position of the touchscreen display 2 (i.e. if the user presses the touchscreen display 2 hard).

Moreover, for example, the selected input character candidate may be confirmed in response to input of a switch provided outside the electronic device 1. In this case, the switch provided outside the electronic device 1 may notify the electronic device 1 of the input of the switch, through wireless communication such as Bluetooth®. Alternatively, the switch provided outside the electronic device 1 may notify the electronic device 1 of the input of the switch, through wired connection via the connector 14 as an example. For example, if such a switch provided outside the electronic device 1 is installed in an attachment that can be mounted on at least part of the housing of the electronic device 1, usability can be further improved.

Figure 9A:
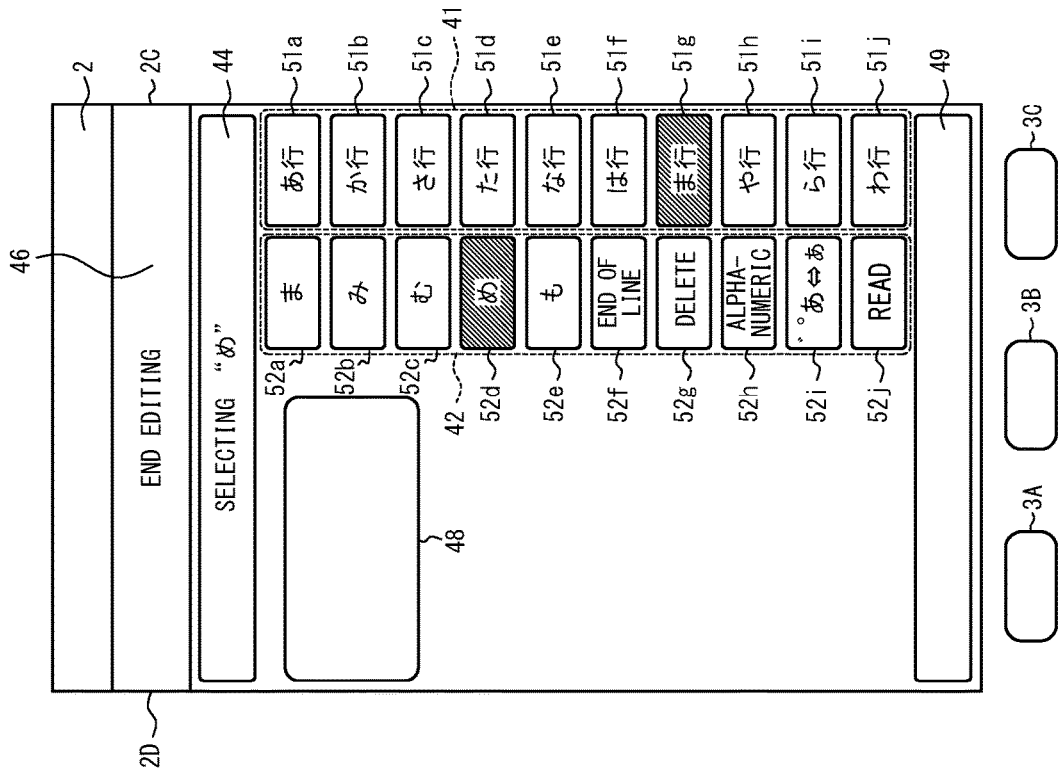
FIG. 9A is a diagram illustrating operation of the electronic device according to an embodiment of the disclosure.

In the state in FIG. 8B, "し" is selected as an input character candidate, but an input character is not confirmed yet, as mentioned above. For example, suppose input by the user's finger is detected at the "ま行" key of the first key 51g included in the first key group 51, in the state in FIG. 8B. In this case, the controller 10 displays the keys of the respective characters ("ま", "み", "む", "め", "も") corresponding to the "ま行" key in the second key area 42 as the second keys 52a to 52e included in the second key group 52, as illustrated in FIG. 9A. In FIG. 9A, to indicate the detection of input of the "ま行" key of the first key 51g, the key is displayed differently from the other keys.

Figure 9B:
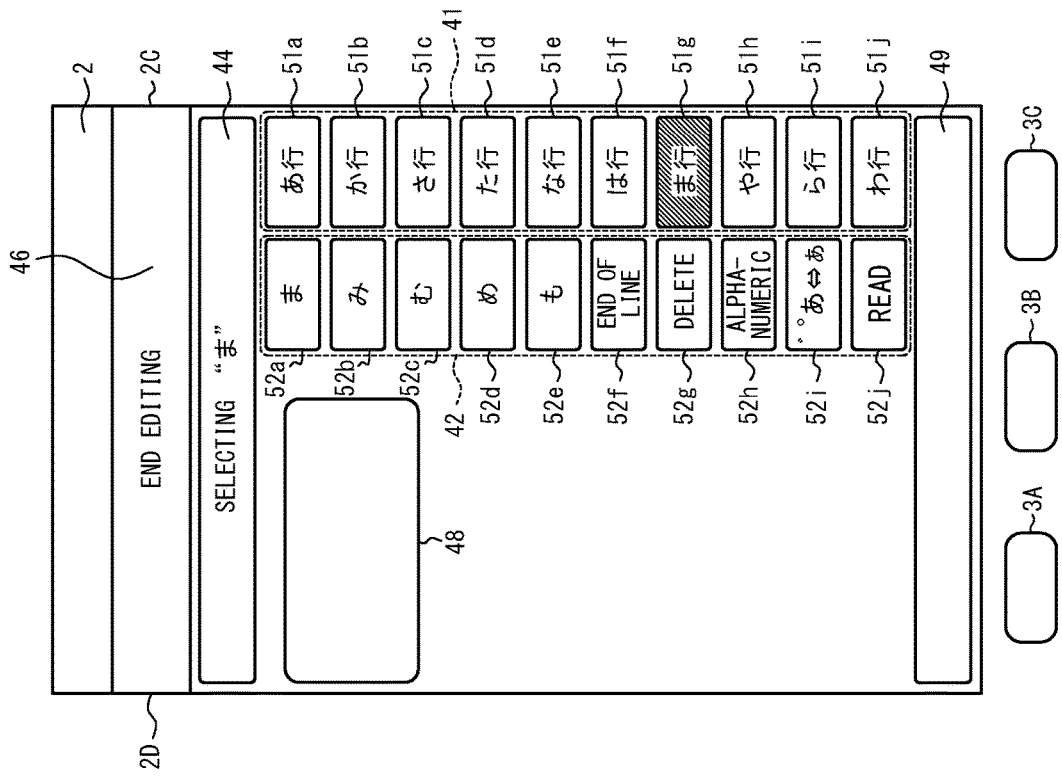
FIG. 9B is a diagram illustrating operation of the electronic device according to an embodiment of the disclosure.

For example, suppose input by the user's finger is detected at the "め" key in the second key 52d included in the second key group 52, in the state in FIG. 9A. In this case, the controller 10 selects the character "め" as an input character candidate, as illustrated in FIG. 9B. In FIG. 9B, to indicate that "め" is selected as an input character candidate, "selecting "め"" is displayed in the state notification field 44. In FIG. 9B, to indicate the detection of input of the "め" key in the second key 52d, the key is displayed differently from the other keys.

In the state in FIG. 9B, "め" is selected as an input character candidate, but an input character is not confirmed yet. Accordingly, if input of any other first key included in the first key group 51 is detected, the controller 10 displays the keys of the respective characters of the column corresponding to the input first key, in the second key area 42. Moreover, in the state in FIG. 9B, the controller 10 may confirm the currently selected input character candidate, for example, in response to detecting input of the OK key 49.

As an operation of transitioning from the state in FIG. 8A to the state in FIG. 9A, at least the following operation may be performed. For example, in the state in FIG. 8A, the user touches the "さ行" key of the key 51c in the first key area 41, so that the keys of the respective characters of the "さ行" key are displayed in the second key area 42. Here, the user once releases the touch from the touchscreen display 2. The user then touches the "ま行" key of the key 51g in the first key area 41, as a result of which the keys of the respective characters of the "ま行" are displayed in the second key area 42, as illustrated in FIG. 9A.

In the case of performing the operation as illustrated in FIGS. 8A to 9B, input of any of the first keys 51a to 51j included in the first key group 51 may be detected as continuous sliding operation in the first key area 41. For example, in the state in FIG. 8A, the user touches the "さ行" key of the key 51c in the first key area 41, so that the keys of the respective characters of the "さ行" are displayed in the second key area 42. Here, the user performs sliding operation in the first key area 41, while touching the touchscreen display 2. In response to detecting continuous sliding operation to the "ま行" key of the key 51g in the first key area 41, the keys of the respective characters of the "ま行" are displayed in the second key area 42, as illustrated in FIG. 9A.

In such a case where sliding operation is performed across a plurality of first keys in the first key area 41, the column corresponding to each intermediate first key between the beginning and end of the sliding operation may or may not be displayed in the second key area 42. For example, suppose the user performs quick sliding operation from the "さ行" key of the key 51c in FIG. 8A to the "ま行" key of the key 51g in FIG. 9A. In such a case, the controller 10 may quickly display the keys of the respective characters of each of the intermediate "た行", "な行", and "は行" in sequence synchronously with the sliding operation, in the second key area 42. Alternatively, the controller 10 may omit displaying the keys of the respective characters of each of the intermediate "た行", "な行", and "は行".

Upon starting character input by the electronic device 1 (initial state), the state where the "あ行" key of the key 51a is selected in the first key area 41 may be used as default, as illustrated in FIG. 6. Moreover, in this state, the state where the "あ" key of the key 52a is selected in the second key area 42 may be used as default, as illustrated in FIG. 6.

Likewise, in the state where "さ行" of the key 51c is selected in the first key area 41, the state where the character "さ" of the key 52a is selected in the second key area 42 may be used as default, as illustrated in FIG. 8A. In the state where "ま行" of the key 51g is selected in the first key area 41, the state where the character "ま" of the key 52a is selected in the second key area 42 may be used as default, as illustrated in FIG. 9A. Thus, in the state where any "行" in the first key group 51 is selected in the first key area 41, the state where the character of "あ段" of the key 52a is selected in the second key area 42 may be used as default.

In the case of performing the operation as illustrated in FIGS. 8A to 9B, for example when an input character candidate is selected first or when a selected input character candidate is changed, the controller 10 may output the currently selected input character candidate as a sound signal. In this case, the sound signal output from the controller 10 may be output from the receiver 7, the speaker 11, or the like as sound. When the selected input character candidate is confirmed, too, the controller 10 may output the confirmed character as a sound signal. This allows the user to recognize the character input made by his or her operation, by sound. For example, even in the case where the user is not looking at the display 2A or the user has a vision problem, the user can operate the electronic device 1 to input characters according to audio guidance.

Moreover, for example in the case where the key in the first key group 51 at which input is detected is changed in the first key area 41, the controller 10 may cause the vibrator 19 to generate vibration. Further, for example when an input character candidate is selected first or when a selected input character candidate is changed, the controller 10 may cause the vibrator 19 to generate vibration. This allows the user to easily recognize that his or her operation is detected by the electronic device 1, by tactile sensation. For example, even in the case where the user is not looking at the display 2A or the user has a vision problem, the user can recognize the operation status of the electronic device 1.

Thus, in this embodiment, the controller 10 causes the touchscreen display 2 to display the first key group 51 and the second key group 52. Here, the controller 10 arranges the first key group 51 along an edge of the touchscreen display 2, and arranges the second key group 52 along the first key group 51. In this embodiment, the first key group 51 and the second key group 52 are both located near one side edge (e.g. right edge) of the touchscreen display 2, as illustrated in FIGS. 6 and 8A to 9B. Therefore, in this embodiment, the controller 10 does not arrange any key at the position (the side 2D) opposite to the position (the side 2C) where the first key group 51 and the second key group 52 are arranged. In other words, the controller 10 does not arrange any key along the opposite edge (the side 2D) to the position (the side 2C) where the first key group 51 is arranged, on the touchscreen display 2.

In the electronic device 1, the controller 10 may change the display of the second key group 52 in response to input of any of the first keys 51a to 51j in the first key group 51, as mentioned above. The controller 10 may also output, in response to input of any of the second keys 52a to 52e in the second key group 52, the character assigned to the key. In this case, in response to input of any of the second keys 52a to 52e in the second key group 52, the controller 10 may output the character assigned to the key as an input candidate. The electronic device 1 thus enables flexible and reliable character input by very simple operation of two lines of key areas arranged side by side.

Figure 10:
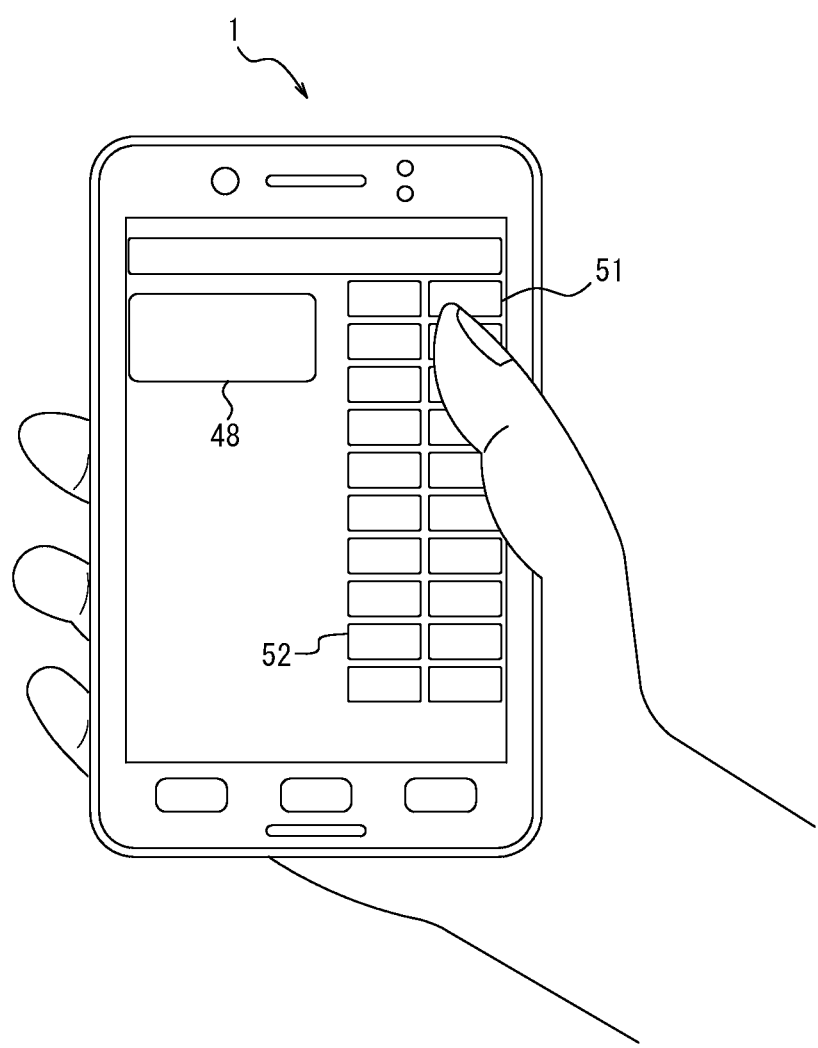
FIG. 10 is a diagram illustrating an operating state of the electronic device according to an embodiment of the disclosure.

Arranging the first key group 51 and the second key group 52 in this way allows the user to, when holding the electronic device 1 with one hand, perform character input operation using a finger of the hand holding the electronic device 1, as illustrated in FIG. 10. The electronic device 1 according to this embodiment thus enables character input by simple operation using only one hand, and so can improve character input operability. FIG. 10 illustrates an example where the user performs operation with the right hand. In the case where the user performs operation with the left hand, display of the first key group 51 and the second key group 52 may be swapped (and moved to near the left side) on the touchscreen display 2 in FIG. 6 and the like. This enables the user to perform character input operation with only the left hand.

In recent years, while there is still strong tendency to reduce the size and weight of electronic devices such as smartphones, the demand for larger touchscreen displays is also growing. A larger touchscreen display can display more information at one time, thus providing better visibility. With a larger touchscreen display, however, the user may find it difficult to input characters to software keys displayed on the touchscreen display with one hand. When the user, while holding an electronic device having a larger touchscreen display with one hand, tries to operate software keys with a finger of the hand, the finger may not be able to reach some keys depending on their positions. In particular, for users with small hands such as women or children, key operation is expected to be difficult. On the touchscreen display 2 in the electronic device 1 according to this embodiment, on the other hand, the keys are arranged in two lines on one side. This reduces inconvenience of not being able to reach a key with a finger even in such a case where the user has small hands.

An Embodiment of the Disclosure

In foregoing embodiment, the second key group 52 displayed in the second key area 52 is changed in response to detecting input of any key of the first key group 51 in the first key area 41 or sliding operation in the first key area 41. Here, input of any second key of the second key group 52 may be separate input which is discontinuous from key input in the first key area 41. In an embodiment of the disclosure, on the other hand, input of any second key of the second key group 52 is enabled by sliding operation performed continuously from key input in the first key area 41.

Figure 11A:
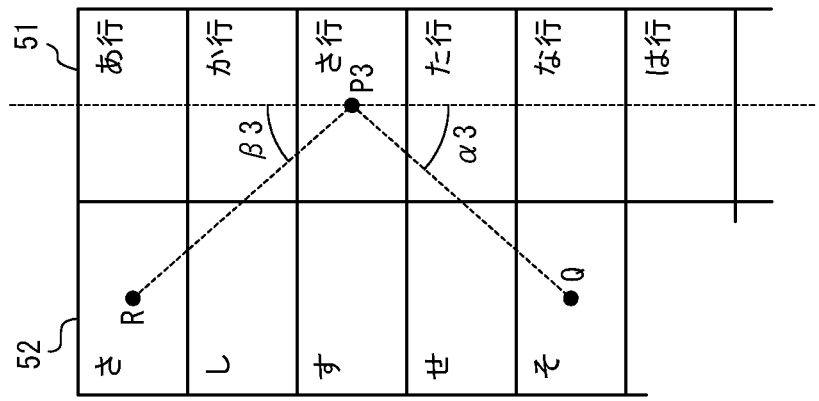
FIG. 11A is a diagram illustrating operation of an electronic device according to an embodiment of the disclosure.
Figure 11B:
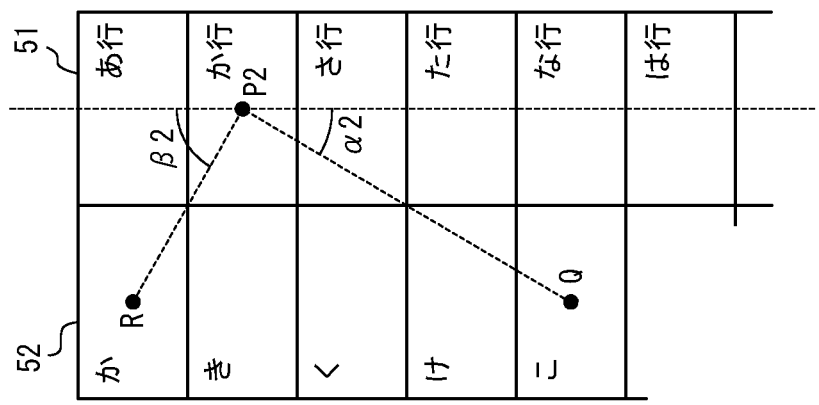
FIG. 11B is a diagram illustrating operation of the elecronic device according to an embodiment of the disclosure.
Figure 11C:
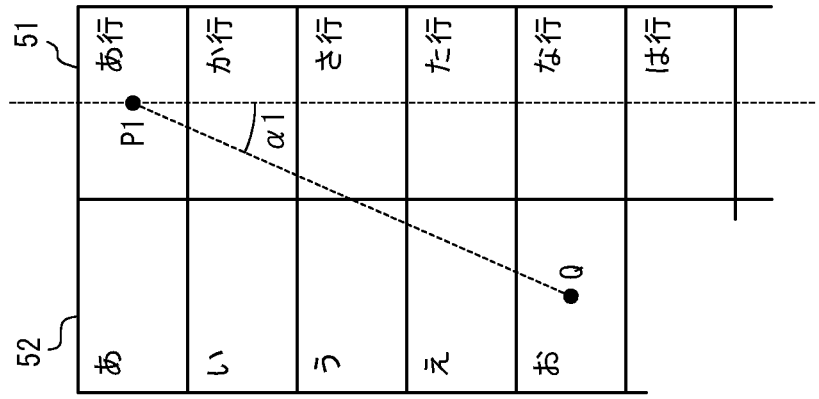
FIG. 11C is a diagram illustrating operation of the electronic device according to an embodiment of the disclosure.

FIGS. 11A to 11C illustrate a process of performing input of any second key of the second key group 52 by sliding operation in this embodiment. FIGS. 11A to 11C illustrate only part of each of the first key group 51 and the second key group 52, for simplicity of explanation.

In FIGS. 11A to 11C, the vertical direction in which the first key group 51 is arranged is referred to as "predetermined direction". The predetermined direction may be typically regarded as the direction in which sliding operation is performed along a plurality of first keys in the first key group 51.

FIG. 11A is a diagram illustrating the case where sliding operation is performed from position P1 of the "あ行" key in the first key group 51. In FIG. 11A, in response to input of the "あ行" key (P1) in the first key group 51, the characters corresponding to "あ行" are displayed as the second key group 52. Consider an example where sliding operation is performed from position P1 of the "あ行" key in the first key group 51 to position Q of the "め" key in the second key group 52, as illustrated in FIG. 11A. In this case, the angle between the predetermined direction and the direction in which the sliding operation from position P1 to position Q is performed is denoted by α1, as illustrated in FIG. 11A. Here, α1 is threshold α1 of the angle of sliding operation performed from position P1 of the "あ行" key.

In the case where sliding operation is performed from position P1, if the angle between the direction of the sliding operation and the predetermined direction is less than threshold α1, the controller 10 treats the sliding operation as being performed in the first key group 51. In the case where sliding operation is performed from position P1, if the angle between the direction of the sliding operation and the predetermined direction is greater than or equal to threshold α1, the controller 10 treats the sliding operation as being performed on a key in the second key group 52.

FIG. 11B is a diagram illustrating the case where sliding operation is performed from position P2 of the "か行" key in the first key group 51. In FIG. 11B, in response to input of the "か行" key (P2) in the first key group 51, the characters corresponding to "か行" are displayed as the second key group 52. Consider an example where sliding operation is performed from position P2 of the "か行" key in the first key group 51 to position Q of the "こ" key in the second key group 52, as illustrated in FIG. 11B. In this case, the angle between the predetermined direction and the direction in which the sliding operation from position P2 to position Q is performed is denoted by α2, as illustrated in FIG. 11B. Here, α2 is a threshold of the angle of sliding operation performed downward from position P2 of the "か行" key. Also consider an example where sliding operation is performed from position P2 of the "か行" key in the first key group 51 to position R of the " か " key in the second key group 52, as illustrated in FIG. 11B. In this case, the angle between the predetermined direction and the direction in which the sliding operation from position P2 to position R is performed is denoted by β2, as illustrated in FIG. 11B. Here, β2 is a threshold of the angle of sliding operation performed upward from position P2 of the "か行" key.

In the case where sliding operation is performed from position P2, if the angle between the direction of the sliding operation and the predetermined direction is less than threshold α1 or β2, the controller 10 treats the sliding operation as being performed in the first key group 51. In the case where sliding operation is performed from position P2, if the angle between the direction of the sliding operation and the predetermined direction is greater than or equal to threshold α1 or β2, the controller 10 treats the sliding operation as being performed on a key in the second key group 52.

FIG. 11C is a diagram illustrating the case where sliding operation is performed from position P3 of the "さ行" key in the first key group 51. In FIG. 11C, in response to input of the "さ行" key (P3) in the first key group 51, the characters of "さ行" are displayed as the second key group 52. Consider an example where sliding operation is performed from position P3 of the " さ 行 " key in the first key group 51 to position Q of the "そ" key in the second key group 52, as illustrated in FIG. 11C. In this case, the angle between the predetermined direction and the direction in which the sliding operation from position P3 to position Q is performed is denoted by α3, as illustrated in FIG. 11C. Here, α3 is a threshold of the angle of sliding operation performed downward from position P3 of the "さ行" key. Also consider an example where sliding operation is performed from position P3 of the "さ行" key in the first key group 51 to position R of the "さ" key in the second key group 52, as illustrated in FIG. 11C. In this case, the angle between the predetermined direction and the direction in which the sliding operation from position P3 to position R is performed is denoted by β3, as illustrated in FIG. 11C. Here, β3 is a threshold of the angle of sliding operation performed upward from position P3 of the "さ行" key.

In the case where sliding operation is performed from position P3, if the angle between the direction of the sliding operation and the predetermined direction is less than threshold α3 or β3, the controller 10 treats the sliding operation as being performed in the first key group 51. In the case where sliding operation is performed from position P3, if the angle between the direction of the sliding operation and the predetermined direction is greater than or equal to threshold α3 or β3, the controller 10 treats the sliding operation as being performed on a key in the second key group 52.

Thus, in this embodiment, the controller 10 may determine whether or not input of any key in the first key group 51 is performed, depending on the angle between the direction of the sliding operation performed on the touchscreen display 2 and the predetermined direction. Here, the predetermined direction may be the direction of sliding operation performed within the first key group 51. As described above, the electronic device 1 according to this embodiment enables input of any key of the second key group 52 by sliding operation performed continuously from key input in the first key area 41. In other words, the electronic device 1 according to this embodiment enables a series of operations before confirming an input character candidate to be performed using only sliding operation. The electronic device 1 according to this embodiment can thus further improve character input operability.

Figure 12:
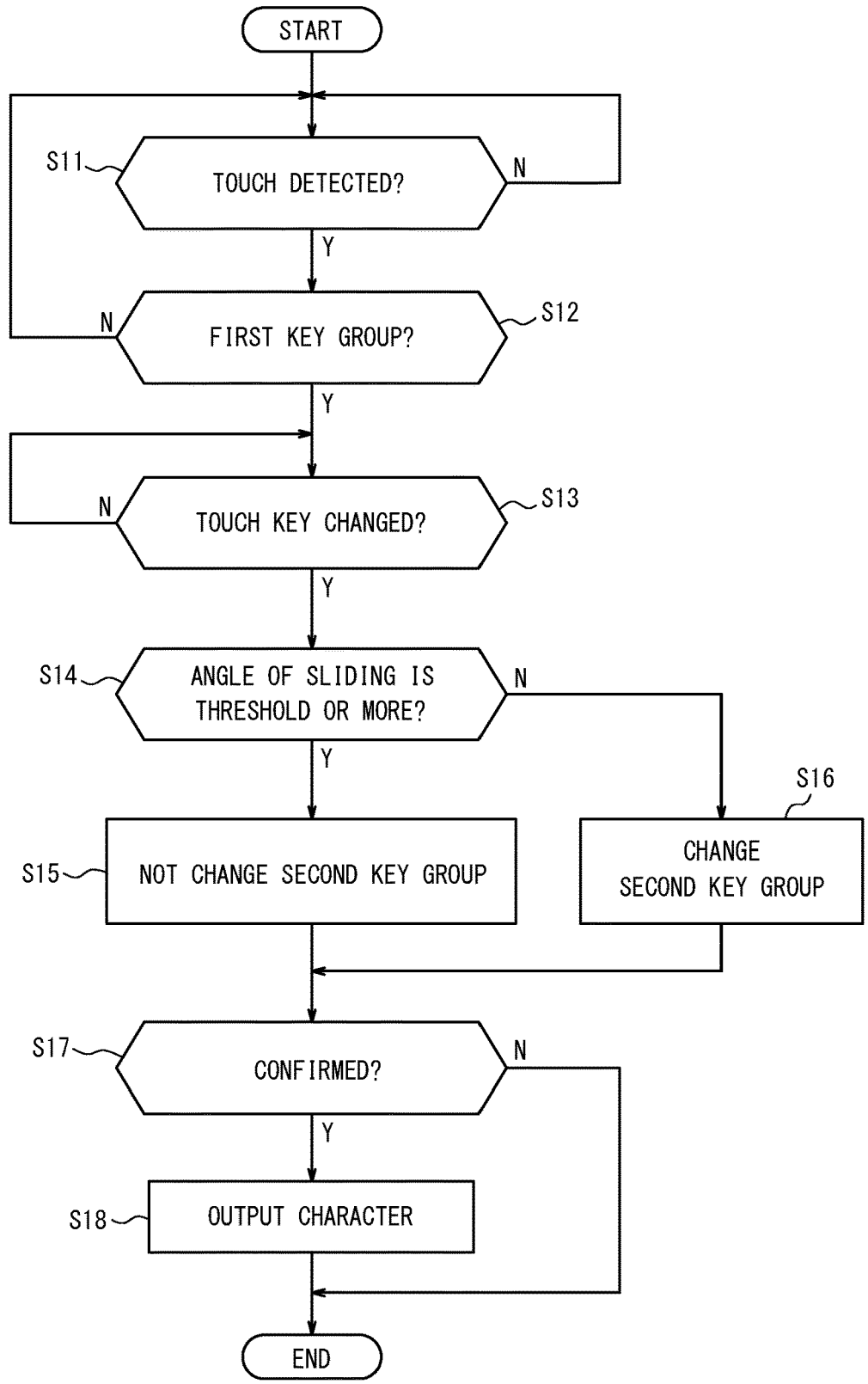
FIG. 12 is a flowchart illustrating an example of control by the electronic device according to an embodiment of the disclosure.

Control performed by the electronic device 1 according to an embodiment of the disclosure to realize the above-mentioned operation is described in more detail below. FIG. 12 is a flowchart illustrating control by the electronic device 1 according to an embodiment of the disclosure.

As illustrated in FIG. 12, in the electronic device 1 according to an embodiment of the disclosure, the controller 10 first determines whether or not a touch on the touchscreen display 2 is detected (step S11). In step S11, the controller 10 waits until a touch on the touchscreen display 2 is detected.

In the case where a touch on the touchscreen display 2 is detected in step S11, the controller 10 determines whether or not the detected touch is on any key in the first key group 51 (step S12). The controller 10 detects a touch on the touchscreen display 2 until the detected touch is on any key in the first key group 51 in step S12 (step S11).

In the case where the detected touch is on any key in the first key group 51 in step S12, the controller 10 determines whether or not the key at which the touch is detected on the touchscreen display 2 is changed (step S13). In step S13, the controller 10 waits until the key at which the touch is detected on the touchscreen display 2 is changed.

In the case where the key at which the touch is detected is changed in step S13, the controller 10 determines whether or not the angle of the direction of the sliding operation with respect to the predetermined direction is greater than or equal to a threshold (step S14).

In the case where the angle of the direction of the sliding operation with respect to the predetermined direction is greater than or equal to the threshold in step S14, the sliding operation is treated as being performed on a key in the second key group 52. In this case, the controller 10 does not change the display of the second key group 52 (step S15), i.e. maintains the display of the second key group 52.

In the case where the angle of the direction of the sliding operation is less than the threshold in step S14, the sliding operation is treated as being performed in the first key group 51. In this case, the controller 10 changes the display of the second key group 52 (step S16). In step S16, the controller 10 displays the characters (e.g. "か", "き", "く", "け", "こ") of a column (e.g. "か行") corresponding to a key in the first key area 41, in the second key area 42.

After step S15 or S16, the controller 10 determines whether or not the currently selected input character candidate is confirmed (step S17). In the case where the input character candidate is not confirmed in step S17, the controller 10 ends the process illustrated in FIG. 12.

In the case where the input character candidate is confirmed in step S17, the controller 10 outputs the confirmed character (step S18). In step S18, the controller 10 displays the output character in the input text display field 48.

After outputting the confirmed character in step S18, the controller 10 ends the process illustrated in FIG. 12. In the case of continuing character input after ending the process illustrated in FIG. 12, the controller 10 starts the process illustrated in FIG. 12 again.

In this way, the electronic device 1 according to this embodiment enables a series of operations before confirming an input character candidate to be performed using only sliding operation. The electronic device 1 according to this embodiment can thus further improve character input operability.

An Embodiment of the Disclosure

An electronic device according to an embodiment of the disclosure is described below.

Foregoing embodiments describe an example where the first key group 51 and the second key group 52 are already displayed when the user starts character input, as illustrated in FIG. 6 and the like. In some embodiments, it is assumed that basically the first key group 51 and the second key group 52 are both displayed even in the state where, for example, the user is not touching the touchscreen display 2 during character input. On the other hand, the electronic device 1 according to an embodiment of the disclosure displays only the first key group 51 in the state where no touch on the touchscreen display 2 is detected.

Figure 13A:
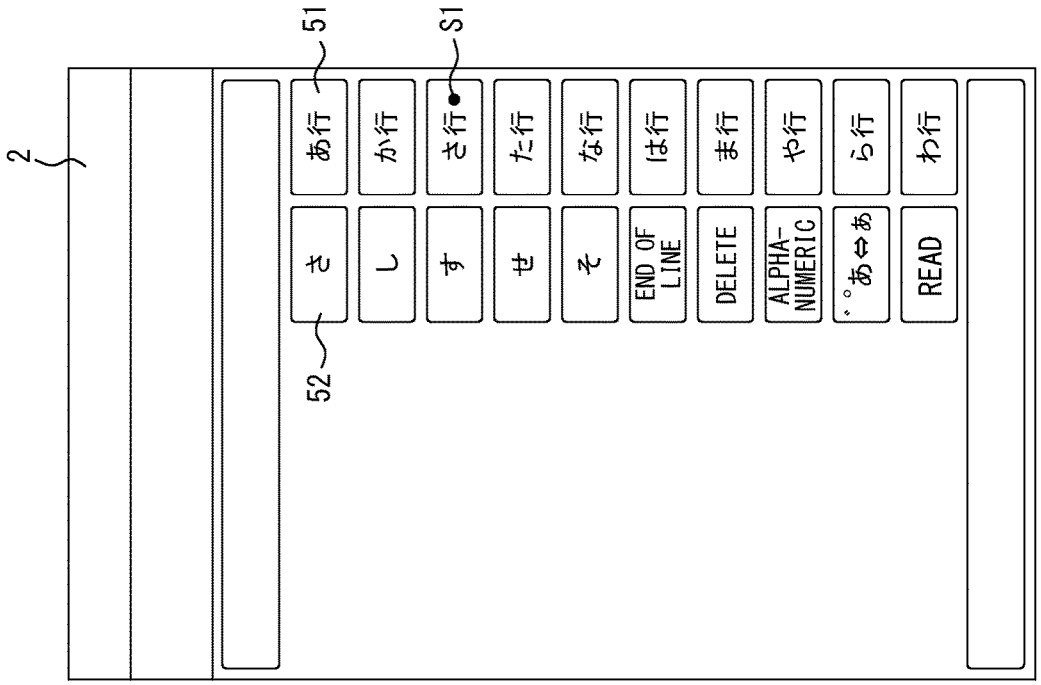
FIG. 13A is a diagram illustrating an electronic device according to an embodiment of the disclosure.
Figure 13B:
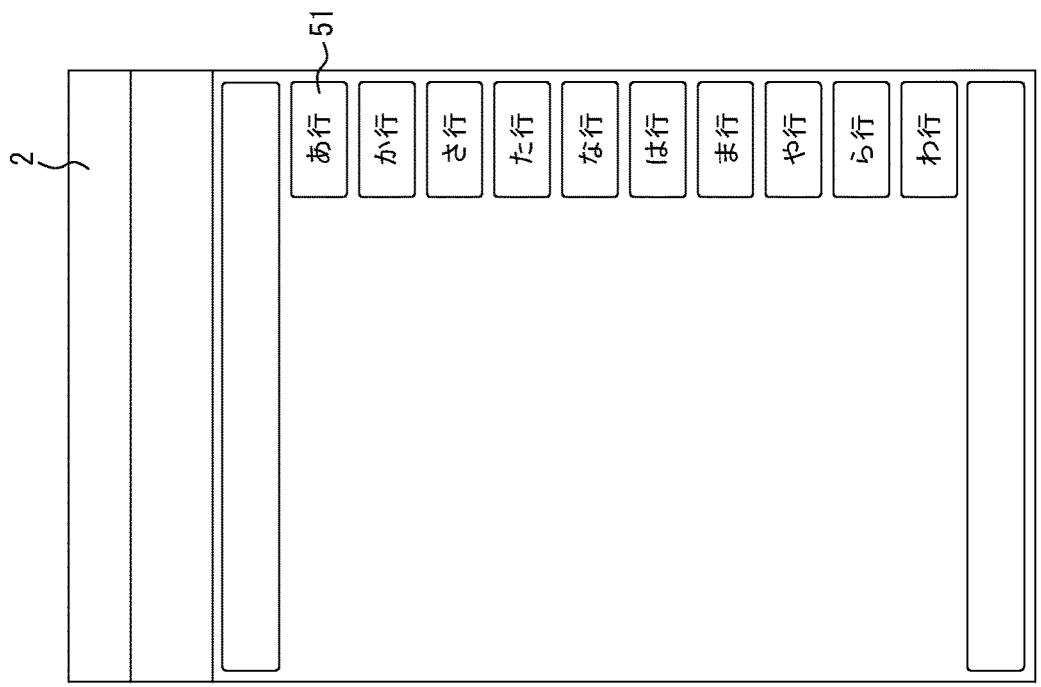
FIG. 13B is a diagram illustrating the electronic device according to an embodiment of the disclosure.

FIGS. 13A and 13B are each a diagram illustrating display on the touchscreen display 2 in the electronic device 1 according to an embodiment of the disclosure. In the state where no touch on the touchscreen display 2 is detected, the controller 10 displays only the first key group 51, as illustrated in FIG. 13A. When input of a key in the first key group 51 is detected, the controller 10 displays the characters of the column corresponding to the key at which the input is detected, as the second key group 52. In this embodiment, for example, when input of the "さ行" key (position S1) in the first key group 51 is detected, the characters of "さ行" are displayed as the second key group 52, as illustrated in FIG. 13B. In this state, the user can perform input on any key in the second key group 52, or perform sliding operation to any key in the second key group 52.

In the case where input at position S1 by the user becomes undetected in the state in FIG. 13B, the characters of "さ行" may remain displayed as the second key group 52. Alternatively, in the case where input at position S1 by the user becomes undetected in the state in FIG. 13B, the display of the second key group 52 may be stopped as illustrated in FIG. 13A.

Figure 14A:
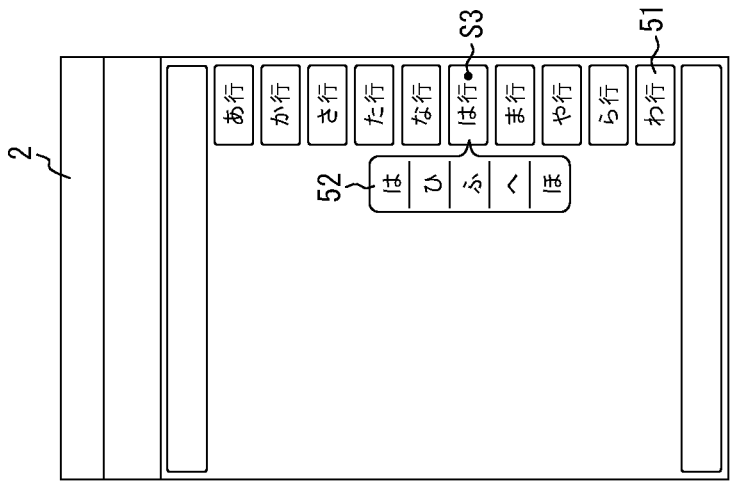
FIG. 14A is a diagram illustrating an electronic device according to a modification of an embodiment of the disclosure.
Figure 14B:
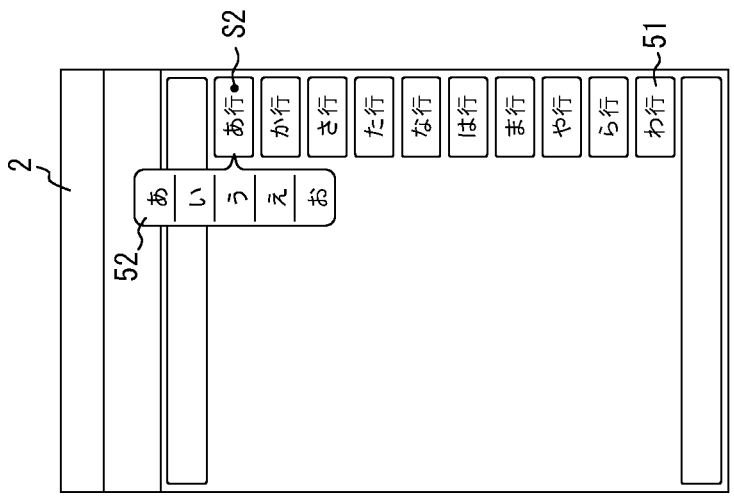
FIG. 14B is a diagram illustrating the electronic device according to the modification of an embodiment of the disclosure.
Figure 14C:
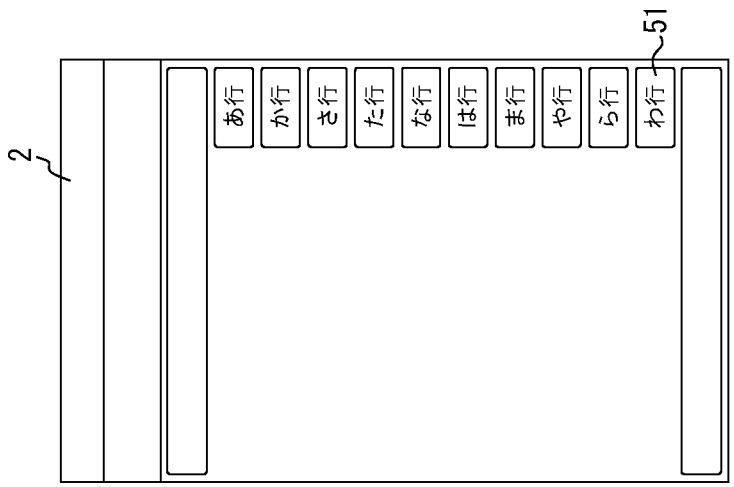
FIG. 14C is a diagram illustrating the electronic device according to the modification of an embodiment of the disclosure.

FIGS. 14A to 14C are each a diagram illustrating display on the touchscreen display 2 in the electronic device 1 according to an embodiment of the disclosure.

FIG. 14A illustrates the state where no touch on the touchscreen display 2 is detected, as in FIG. 13A. In this state, the controller 10 displays only the first key group 51, as illustrated in FIG. 14A.

In this modification, on the other hand, for example when input of the "あ行" key (position S2) in the first key group 51 is detected, the characters corresponding to "あ行" are displayed as the second key group 52 like a pop-up for the "あ行" key, as illustrated in FIG. 14B. In this state, the user can perform input on any key in the second key group 52, or perform sliding operation to any key in the second key group 52. Moreover, in this modification, for example when input of the "は行" key (position S3) in the first key group 51 is detected, the characters corresponding to "は行" are displayed as the second key group 52 like a pop-up for the "は行" key, as illustrated in FIG. 14C.

Thus, according to the embodiment of the disclosure, the second key group 52 is not displayed unless necessary. The embodiment of the disclosure can therefore reduce the risk of an input error, i.e. the user erroneously touching the second key group 52. Moreover, according to the embodiment of the disclosure, the input text display field 48 or the like can be displayed in a wider area when the second key group 52 is not displayed. The embodiment of the disclosure therefore achieves effective use of the limited display area on the touchscreen display 2.

An Embodiment of the Disclosure

An electronic device according to an embodiment of the disclosure is described below.

Foregoing embodiments describe an example where the first key group 51 and the second key group 52 are already displayed when the user starts character input, as illustrated in FIG. 6 and the like. In an embodiment of the disclosure, on the other hand, the first key group 51 and the second key group 52 that are not displayed initially are displayed by simple operation by the user.

Figure 15C:
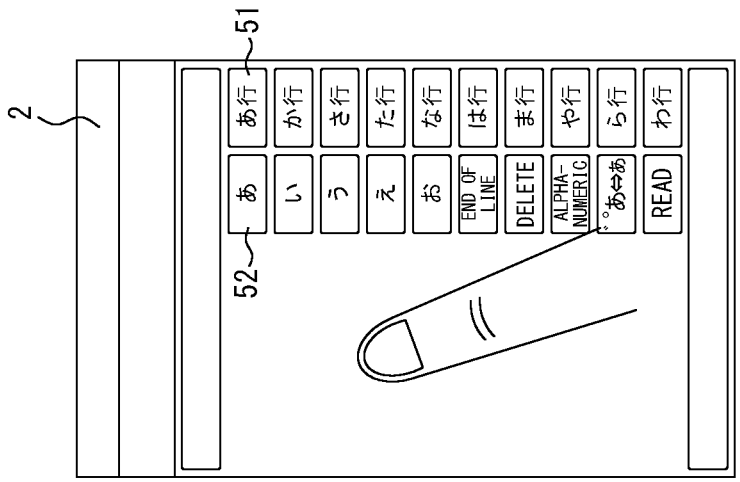
FIG. 15C is a diagram illustrating the electronic device according to an embodiment of the disclosure.
Figure 15B:
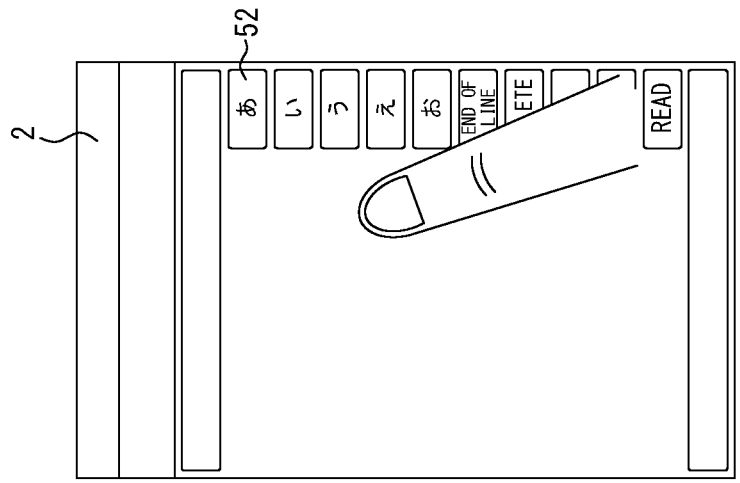
FIG. 15B is a diagram illustrating the electronic device according to an embodiment of the disclosure.
Figure 15A:
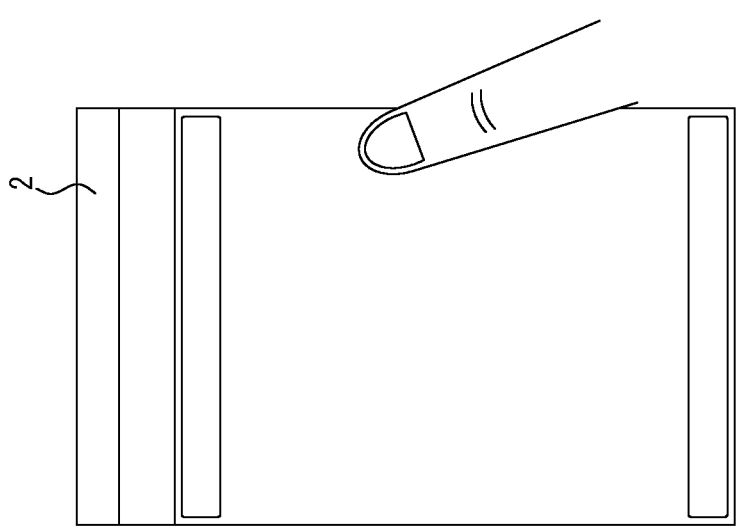
FIG. 15A is a diagram illustrating an electronic device according to an embodiment of the disclosure.

FIGS. 15A to 15C are each a diagram illustrating display on the touchscreen display 2 in the electronic device 1 according to an embodiment of the disclosure. In the embodiment of the disclosure, in the state where character input is not started yet, the first key group 51 and the second key group 52 are not displayed on the touchscreen display 2, as illustrated in FIG. 15A. As illustrated in FIGS. 15A to 15C, in the embodiment of the disclosure, the controller 10 sequentially displays the second key group 52 and the first key group 51 in response to the user's operation of swiping (sliding) on the touchscreen display 2 from right to left. Here, the controller 10 may sequentially display the second key group 52 and the first key group 51 so as to follow the trajectory of the detected swipe (slide).

FIGS. 15A to 15C illustrate the state where the user gradually swipes (slides) on the touchscreen display 2 from right to left, in this order. In the embodiment of the disclosure, first the second key group 52 and then the first key group 51 are displayed on the touchscreen display 2 in response to the swipe (slide), as illustrated in FIGS. 15A to 15C. Thus, FIGS. 15A to 15C illustrate an example suitable for the user holding the electronic device 1 with the right hand and swiping (sliding) on the touchscreen display 2 from right to left with a finger of the right hand so that the second key group 52 and the first key group 51 appear.

Figure 16C:
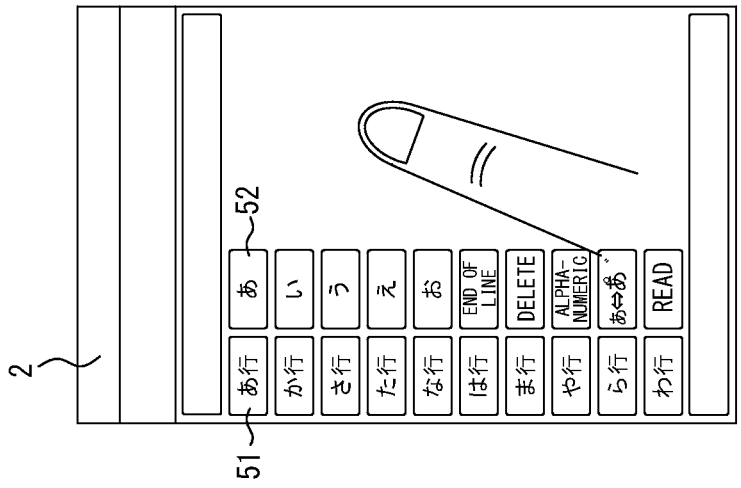
FIG. 16C is a diagram illustrating the electronic device according to an embodiment of the disclosure.
Figure 16B:
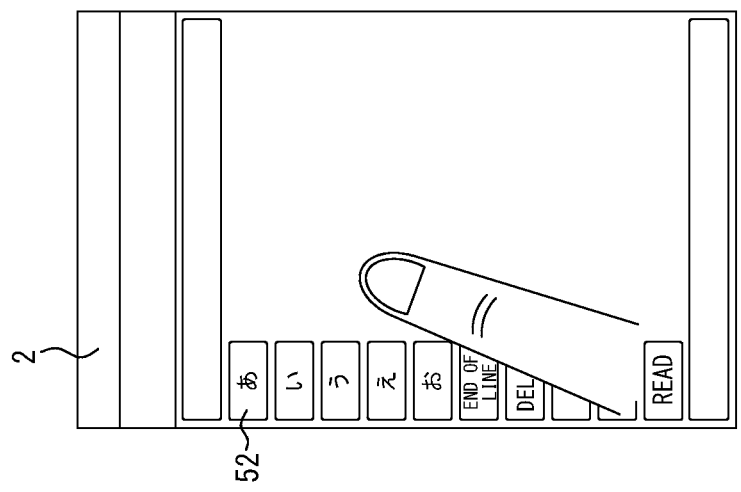
FIG. 16B is a diagram illustrating the electronic device according to an embodiment of the disclosure.
Figure 16A:
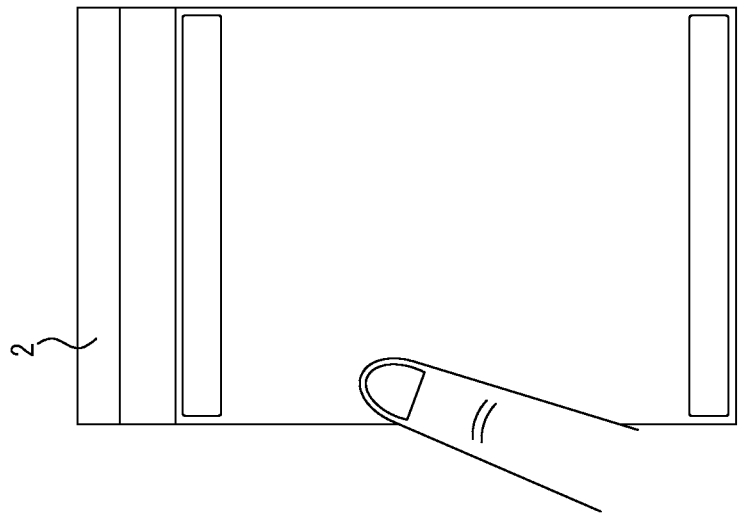
FIG. 16A is a diagram illustrating the electronic device according to an embodiment of the disclosure.

FIGS. 16A to 16C illustrate the state where the user gradually swipes (slides) on the touchscreen display 2 from left to right, in this order. As illustrated in FIGS. 16A to 16C, the controller 10 sequentially displays the second key group 52 and the first key group 51 in response to the user's operation of swiping (sliding) on the touchscreen display 2 from left to right. In the embodiment of the disclosure, first the second key group 52 and then the first key group 51 are displayed on the touchscreen display 2 in response to the swipe (slide), as illustrated in FIGS. 16A to 16C. Thus, FIGS. 16A to 16C illustrate an example suitable for the user holding the electronic device 1 with the left hand and swiping (sliding) on the touchscreen display 2 from left to right with a finger of the left hand so that the second key group 52 and the first key group 51 appear.

Thus, the electronic device 1 according to the embodiment of the disclosure enables the user to display the appropriate first key group 51 and second key group 52 with the right hand or the left hand by one action.

An Embodiment of the Disclosure

Each of the foregoing embodiments assumes the case where the electronic device 1 is used to input Japanese kana characters. However, the characters that can be input by the electronic device 1 according to each of the foregoing embodiments is not limited to Japanese kana characters. In the electronic device 1 according to each of the foregoing embodiments, the data stored in the storage 9 as the first key data 9C and the second key data 9D illustrated in FIG. 7 can be changed to any type of language as appropriate. The electronic device 1 according to each of the foregoing embodiments is thus capable of character input of various languages.

Figure 17:
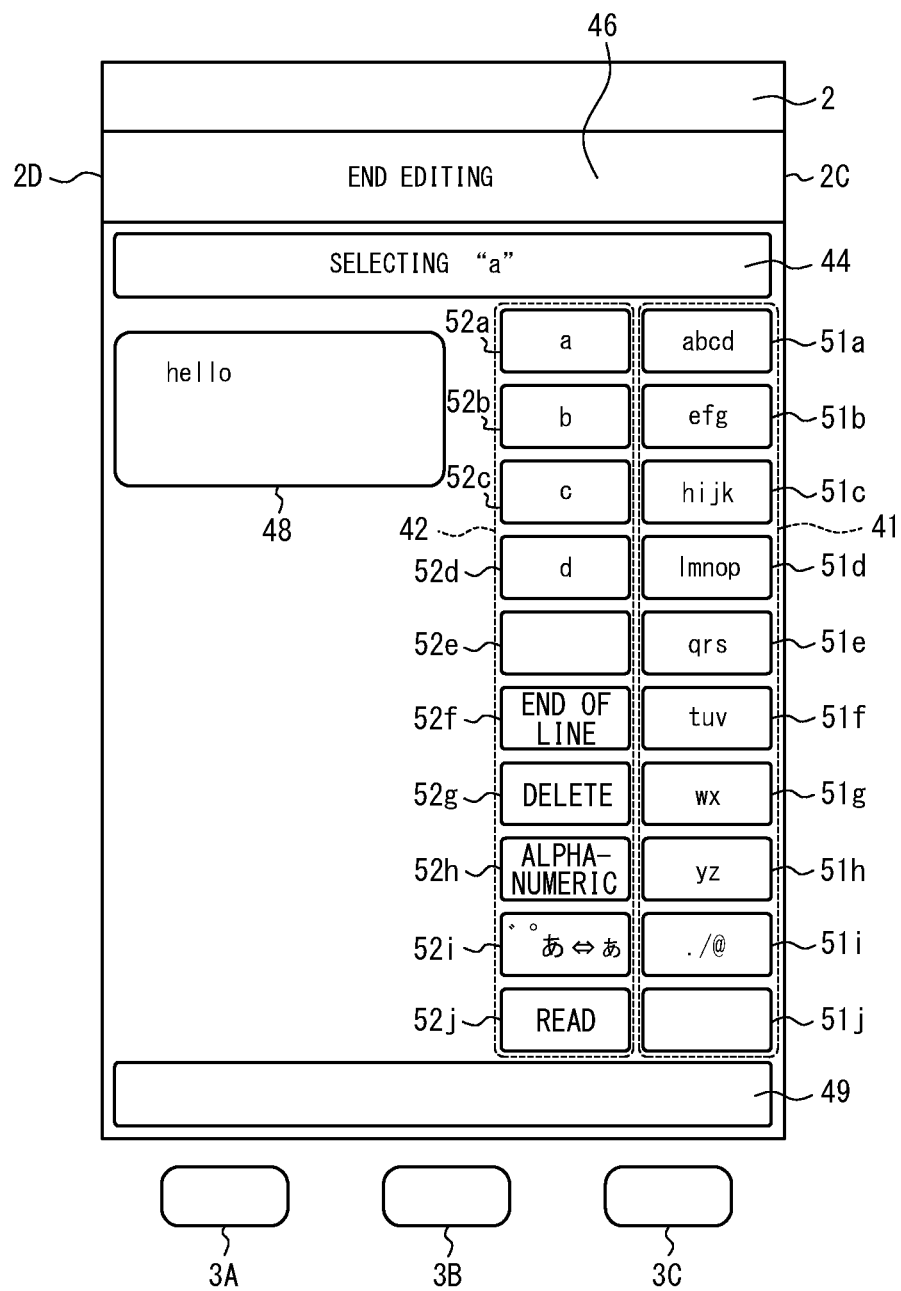
FIG. 17 is a diagram illustrating an electronic device according to an embodiment of the disclosure.

FIG. 17 is a diagram illustrating an example of a screen in the case of inputting alphabet characters in the electronic device 1. In the example illustrated in FIG. 17, in response to input of an "abcd" key 51a in the first key area 41, "a", "b", "c", and "d" are displayed in the second key area 42. As another example, in response to input of an "efg" key 51b in the first key area 41, "e", "f", and "g" are displayed in the second key area 42.

Although the disclosed device, method, and program have been described by way of the drawings and embodiments, various changes and modifications may be easily made by those of ordinary skill in the art based on this disclosure. Such various changes and modifications are therefore included in the scope of this disclosure. For example, the functions included in the means, steps, etc. may be rearranged without logical inconsistency, and a plurality of means, steps, etc. may be combined into one means, step, etc. and a means, step, etc. may be divided into a plurality of means, steps, etc.

Each of the foregoing embodiments describes the electronic device 1 as a typical example. However, each of the foregoing embodiments is not limited to the electronic device 1. For example, each of the foregoing embodiments may be a control method for an electronic device such as the electronic device 1. In this case, the control method for an electronic device includes arranging the first key group 51 along an edge of the touchscreen display 2 and arranging the second key group 52 along the first key group 51 by the controller 10.

Each of the foregoing embodiments may be a program for an electronic device such as the electronic device 1. In this case, the program for an electronic device causes the controller 10 to arrange the first key group 51 along an edge of the touchscreen display 2 and arrange the second key group 52 along the first key group 51.

Each of the foregoing embodiments describes the case of performing character input using the electronic device 1. However, the functions of the electronic device 1 according to each of the foregoing embodiments are not limited to the character input function.

As an example, the electronic device 1 according to each of the foregoing embodiments is capable of executing functions for performing various processes such as selecting items classified in several subcategories. The electronic device 1 can thus be used not only for character input, but also for input of symbols or pictograms classified in sub-categories. For example, the electronic device 1 may perform a function of selecting emoticons classified in emotion-specific subcategories (happy, sad, angry, etc.). In this case, the first key group 51 displayed in the first key area 41 includes keys such as "happy", "sad", and "angry". For example, in response to input of the "happy" key in the first key group 51, a plurality of emoticons expressing various types of "happy" feeling is displayed as the second key group 52.

As another example, the electronic device 1 according to each of the foregoing embodiments is capable of a filer function, that is, a function of selecting items such as subfolders or files classified in folders of several subcategories For example, the electronic device 1 may perform a function of selecting subfolders or files included in each of folders classified in subcategories (application, document, music, etc.). In this case, the first key group 51 displayed in the first key area 41 includes keys such as "application", "document", and "music". For example, in response to input of the "application" key in the first key group 51, a plurality of icons for executing various types of "application" is displayed as the second key group 52. Moreover, in response to input of the "music" key in the first key group 51, an icon for executing "application" of music player, files of music data, and the like are displayed as the second key group 52.

Many of the disclosed aspects are described in terms of sequences of operations performed by a computer system or other hardware capable of executing program instructions. Examples of the computer system or other hardware include a general-purpose computer, personal computer (PC), dedicated computer, workstation, personal communications system (PCS), cellular phone, cellular phone capable of data processing, RFID receiver, game machine, electronic notepad, laptop computer, global positioning system (GPS) receiver, and other programmable data processors. Note that, in each embodiment, various operations are executed by dedicated circuitry (e.g. discrete logical gates interconnected to realize specific functions) implemented by program instructions (software) or logical blocks, program modules, or the like executed by at least one processor. Examples of at least one processor executing logical blocks, program modules, or the like include at least one microprocessor, central processing unit (CPU), application specific integrated circuit (ASIC), digital signal processor (DSP), programmable logic device (PLD), field programmable gate array (FPGA), processor, controller, microcontroller, microprocessor, electronic device, other devices designed to execute the functions described herein, and/or any combination thereof. The embodiments described herein are implemented, for example, by hardware, software, firmware, middleware, microcode, or any combination thereof. Instructions may be program code or code segments for performing necessary tasks, and may be stored in a non-transitory machine-readable storage medium or other medium. A code segment may represent a procedure, a function, a subprogram, a program, a routine, a subroutine, a module, a software package, a class, or any combination of instructions, data structures, or program statements. A code segment is connected to another code segment or a hardware circuit, by performing transmission and/or reception of information, data arguments, variables, or storage contents with the other code segment or hardware circuit.

The storage 9 used herein may be in any tangible form of computer-readable carrier (medium) in the categories of solid-state memory, magnetic disk, and optical disk. Such a medium stores an appropriate set of computer instructions, such as program modules, and data structures for causing a processor to carry out the techniques disclosed herein. Examples of the computer-readable medium include an electrical connection having one or more wires, magnetic disk storage medium, magnetic cassette, magnetic tape, other magnetic and optical storage devices (e.g. compact disk (CD), LaserDisc® (LaserDisc is a registered trademark in Japan, other countries, or both), digital versatile disc (DVD® (DVD is a registered trademark in Japan, other countries, or both)), Floppy® (floppy is a registered trademark in Japan, other countries, or both)) disk, Blu-ray Disc®), portable computer disk, random access memory (RAM), read-only memory (ROM), erasable programmable read-only memory (EPROM), electrically erasable programmable read-only memory (EEPROM), flash memory, other rewritable and programmable ROM, other tangible storage medium capable of storage, and any combination thereof. Memory may be provided inside and/or outside a processor/processing unit. The term "memory" used herein indicates any type of memory such as long-term storage, short-term storage, volatile, nonvolatile, and other memory. The number and types of memory are not limited, and the number and types of storage media are not limited.

The invention claimed is:

1. An electronic device, comprising:
 a touchscreen display; and
 a controller configured to cause the touchscreen display to display a first key group and a second key group,
 wherein the controller is configured to
  before detecting an input to the first key group on the touchscreen display,
   arrange the first key group in a predetermined direction along an edge of the touchscreen display, and
   arrange the second key group along the first key group, and
  after the first key group and the second key group are displayed, detect an input to the touchscreen display corresponding to the first key group or the second key group,
 the controller is configured to, in response to detecting the input to one key of the first key group, cause the touchscreen display to change at least one character allocated to each key of the second key group associated with the one key of the first key group,
 the touchscreen display is configured to detect a sliding operation from a first position on the touchscreen display to a second position on the touchscreen display, and
 the controller is configured to
  determine the sliding operation as being performed in the first or second key group, based on a sliding angle between a direction of the sliding operation and the predetermined direction, and
  determine the sliding operation as being performed in the second key group in response to the sliding angle being equal to or greater than a predetermined angle, wherein the predetermined angle is between the predetermined direction and a direction from the first position of the sliding operation detected in the first key group toward an end position of the second key group in the predetermined direction.

2. The electronic device according to claim 1, wherein the controller is configured not to arrange a key at a position opposite to a position at which the first key group and the second key group are arranged.

3. The electronic device according to claim 1, wherein the controller is configured to determine the sliding operation as being performed in the first key group in response to the sliding angle being less than the predetermined angle.

4. A control method for an electronic device that includes a touchscreen display and a controller configured to cause the touchscreen display to display a first key group and a second key group, the control method comprising:
 before detecting an input to the first key group on the touchscreen display,
  arranging, by the controller, the first key group in a predetermined direction along an edge of the touchscreen display, and
  arranging, by the controller, the second key group along the first key group,
 after the first key group and the second key group are displayed, detecting, by the controller, an input to the touchscreen display corresponding to the first key group or the second key group,
 in response to detecting the input to one key of the first key group, causing, by the controller, the touchscreen display to change at least one character allocated to each key of the second key group associated with the one key of the first key group,
 detecting, by the touchscreen display, a sliding operation from a first position on the touchscreen display to a second position on the touchscreen display,
 determining, by the controller, the sliding operation as being performed in the first or second key group, based on a sliding angle between a direction of the sliding operation and the predetermined direction, and
 determining, by the controller, the sliding operation as being performed in the second key group in response to the sliding angle being equal to or greater than a predetermined angle, wherein the predetermined angle is between the predetermined direction and a direction from the first position of the sliding operation detected in the first key group toward an end position of the second key group in the predetermined direction.

5. A non-transitory computer-readable storage medium which stores a program for controlling an electronic device that includes a touchscreen display and a controller configured to cause the touchscreen display to display a first key group and a second key group, wherein the program, when executed, causes the controller to:
 before detecting an input to the first key group on the touchscreen display,
  arrange the first key group in a predetermined direction along an edge of the touchscreen display, and
  arrange the second key group along the first key group,
 after the first key group and the second key group are displayed, detect an input to the touchscreen display corresponding to the first key group or the second key group,
 in response to detecting the input to one key of the first key group, cause the touchscreen display to change at least one character allocated to each key of the second key group associated with the one key of the first key group,
 cause the touchscreen display to detect a sliding operation from a first position on the touchscreen display to a second position on the touchscreen display,
 determine the sliding operation as being performed in the first or second key group, based on a sliding angle between a direction of the sliding operation and the predetermined direction, and
 determine the sliding operation as being performed in the second key group in response to the sliding angle being equal to or greater than a predetermined angle, wherein the predetermined angle is between the predetermined direction and a direction from the first position of the sliding operation detected in the first key group toward an end position of the second key group in the predetermined direction.

6. An electronic device, comprising:

a touchscreen display configured to detect a sliding operation from a first position on the touchscreen display to a second position on the touchscreen display; and a controller configured to cause the touchscreen display to display a first key group and a second key group, wherein the controller is configured to
- arrange the first key group in a predetermined direction along an edge of the touchscreen display,
- arrange the second key group along the first key group,
- after the first key group and the second key group are displayed, detect an input to the touchscreen display corresponding to the first key group or the second key group,
- determine the sliding operation as being performed in the first or second key group, based on a sliding angle between a direction of the sliding operation and the predetermined direction, and
- in response to the sliding angle being equal to or greater than a predetermined angle, determine the sliding operation from the first position at one key among the first key group, across another key among the first key group, to the second position, as being performed in the second key group.

* * * * *